United States Patent
Kim et al.

(10) Patent No.: US 12,381,771 B2
(45) Date of Patent: Aug. 5, 2025

(54) DEVICE FOR LINEAR RECEPTION PROCESSING OF LOW-COMPLEXITY LIGHT OF MULTI-ANTENNA WIRELESS COMMUNICATION SYSTEM, AND OPERATING METHOD THEREFOR

(71) Applicants: Samsung Electronics Co., Ltd., Suwon-si (KR); POSTECH Research and Business Development Foundation, Pohang-si (KR)

(72) Inventors: Kyeongyeon Kim, Suwon-si (KR); Joonho Cho, Pohang-si (KR); Jeonghoon Choi, Pohang-si (KR)

(73) Assignees: Samsung Electronics Co., Ltd., Suwon-si (KR); POSTECH Research and Business Development Foundation, Pohang-si (KR)

( * ) Notice: Subject to any disclaimer, the term of this patent is extended or adjusted under 35 U.S.C. 154(b) by 173 days.

(21) Appl. No.: 18/313,699

(22) Filed: May 8, 2023

(65) Prior Publication Data
US 2023/0275798 A1    Aug. 31, 2023

Related U.S. Application Data

(63) Continuation of application No. PCT/KR2021/015965, filed on Nov. 5, 2021.

(30) Foreign Application Priority Data

Nov. 30, 2020   (KR) .................. 10-2020-0164927

(51) Int. Cl.
*H04L 27/38*     (2006.01)
*H04L 25/49*     (2006.01)
(Continued)

(52) U.S. Cl.
CPC ...... *H04L 27/3854* (2013.01); *H04L 25/4917* (2013.01); *H04L 27/22* (2013.01); *H04L 27/2655* (2013.01)

(58) Field of Classification Search
CPC . H04L 25/4917; H04L 27/0008; H04L 27/22; H04L 27/223; H04L 27/26524;
(Continued)

(56) References Cited

U.S. PATENT DOCUMENTS 7,218,689 B2    5/2007  Gupta
7,372,896 B2    5/2008  Bjerke et al.
(Continued)

FOREIGN PATENT DOCUMENTS

CN    102255707 A    11/2011
EP    2 134 052 A1    12/2009
(Continued)

OTHER PUBLICATIONS

Zihuai Lin et al., Analysis of Receiver Algorithms for LTE SC-FDMA Based Uplink MIMO Systems, Jan. 20, 2010.
(Continued)

*Primary Examiner* — David B Lugo
(74) *Attorney, Agent, or Firm* — Jefferson IP Law, LLP

(57) ABSTRACT

The disclosure relates to a communication technique and a system for converging a fifth generation (5G) and subsequent communication system with Internet of things (IoT) technology to support a higher data transmission rate than a fourth generation (4G) system. The disclosure is applied to the intelligent service based on the 5G and subsequent communication technology and IoT-related technology. The reception device according to the disclosure receives orthogonal frequency division multiplexing (OFDM) signals through a plurality of antennas, aligns the received OFDM signals, converts at least one of the aligned reception signals
(Continued)

into a designated symbol, estimates the data symbols of the reception signals based on the designated condition, and determines the data symbol of the reception signals by synthesizing at least one of the converted reception signals among the estimated reception signals.

15 Claims, 12 Drawing Sheets

(51) Int. Cl.
 *H04L 27/22* (2006.01)
 *H04L 27/26* (2006.01)
(58) Field of Classification Search
 CPC .......... H04L 27/26526; H04L 27/2655; H04L 27/2684; H04L 27/2695; H04L 27/38; H04L 27/3854
 See application file for complete search history.

(56) References Cited

U.S. PATENT DOCUMENTS

| | | | |
|---|---|---|---|
| 7,864,725 | B2 | 1/2011 | Li et al. |
| 8,687,724 | B2 | 4/2014 | Wang et al. |
| 8,718,162 | B2 | 5/2014 | Kato et al. |
| 8,797,837 | B2 | 8/2014 | Li et al. |
| 8,976,745 | B2 | 3/2015 | Kwon et al. |
| 9,178,663 | B2 | 11/2015 | Han et al. |
| 11,283,657 | B2 | 3/2022 | Yun et al. |
| 2008/0225763 | A1* | 9/2008 | Prasad .................. H04W 88/06 370/310 |
| 2009/0231028 | A1* | 9/2009 | Wang ..................... H04L 27/22 329/304 |
| 2012/0257692 | A1* | 10/2012 | Yeung .................. H04L 25/061 375/320 |
| 2020/0136877 | A1* | 4/2020 | Kim ..................... H04L 27/2649 |

FOREIGN PATENT DOCUMENTS

| | | |
|---|---|---|
| JP | 5371722 B2 | 12/2013 |
| KR | 10-2010-0126487 A | 12/2010 |
| KR | 10-1054739 B1 | 8/2011 |
| KR | 10-1535171 B1 | 7/2015 |
| KR | 10-2018-0081424 A | 7/2018 |
| KR | 10-2019-0014647 A | 2/2019 |
| KR | 10-2080915 B1 | 2/2020 |
| KR | 10-2132254 B1 | 7/2020 |
| KR | 10-2208276 B1 | 1/2021 |
| KR | 10-2224679 B1 | 3/2021 |

OTHER PUBLICATIONS

International Search Report dated Feb. 11, 2022, issued in International Application No. PCT/KR2021/015965.

* cited by examiner

DEVICE FOR LINEAR RECEPTION PROCESSING OF LOW-COMPLEXITY LIGHT OF MULTI-ANTENNA WIRELESS COMMUNICATION SYSTEM, AND OPERATING METHOD THEREFOR

CROSS-REFERENCE TO RELATED APPLICATION(S)

This application is a continuation application, claiming priority under § 365(c), of an International application No. PCT/KR2021/015965, filed on Nov. 5, 2021, which is based on and claims the benefit of a Korean patent application number 10-2020-0164927, filed on Nov. 30, 2020, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd., and 2) POSTECH Research and Business Development Foundation.

BACKGROUND

1. Field

The disclosure relates to a low complexity widely linear receiver in a wireless communication system. More particularly, the disclosure relates to providing a receiver having very low complexity in order to improve processing efficiency of a reception signal.

2. Description of Related Art

An effort is being made to develop an improved fifth generation (5G) communication system or a pre-5G communication system in order to meet the increasing demand for wireless data traffic after the commercialization of a fourth generation (4G) communication system. For this reason, the 5G communication system or the pre-5G communication system is called a communication system after the 4G network (Beyond 4G Network) or system after the long-term evolution (LTE) system (Post LTE). In order to achieve a high data rate, the 5G communication system is being considered for implementation in a super high frequency millimeter wave (mmWave) band (e.g., such as a 60 gigahertz (60 GHz) band). In order to alleviate the path loss of radio waves in the super high frequency band and increase the transmission distance of radio waves, in the 5G communication system, beamforming, massive multiple input multiple output (MIMO), Full Dimensional MIMO (FD-MIMO), array antenna, analog beam-forming, and large scale antenna technologies are being discussed. Also, in order to improve the network of the system, in the 5G communication system, technologies such as evolved small cell, advanced small cell, cloud radio access network (cloud RAN), ultra-dense network, Device to Device communication (D2D), wireless backhaul, moving network, cooperative communication, Coordinated Multi-Points (CoMP), interference cancellation, and the like are being developed. Also, in 5G system, an Advanced Coding Modulation (ACM) method such as hybrid frequency shift-keying (FSK) and quadrature amplitude modulation (QAM) (FQAM) and Sliding Window Superposition Coding (SWSC), and an advanced connection technology such as Filter Bank Multi Carrier (FBMC), nonorthogonal multiple access (NOMA), and sparse code multiple access (SCMA), and the like are being developed.

Meanwhile, the Internet is evolving from a human-centered network in which humans generate and consume information to an Internet of Things (IoT) network that exchanges and processes information between distributed components such as an object, and the like. Internet of Everything (IoE) technology, which combines Big data processing technology, and the like through connection with a cloud server, and the like with IoT technology, is also emerging. In order to implement IoT, technology elements such as sensing technology, wired and wireless communication and network infrastructure, service interface technology, and security technology are required, and recently, a technology such as sensor network, Machine to Machine (M2M), and Machine Type Communication (MTC), and the like for connection between objects has been studied. In an IoT environment, an intelligent Internet Technology (IT) service that create a new value in human life by collecting and analyzing data generated from connected objects may be provided. IoT may be applied to field such as smart home, smart building, smart city, smart car or connected car, smart grid, health care, smart home appliance, and advanced medical service, and the like through convergence and combination between an existing information technology (IT) technology and a various industry.

Accordingly, various attempts are being made to apply the 5G communication system to the IoT network. For example, technologies such as sensor network, Machine to Machine (M2M), Machine Type Communication (MTC), and the like are being implemented by techniques such as beamforming, MIMO, array antenna, and the like, which are 5G communication technologies. The application of cloud radio access network (cloud RAN) as a big data processing technology described above may be an example of the convergence of 5G technology and IoT technology.

5G mobile communication tries to improve the communication performance of a cell-edge user in order to support faster transmission speed while having wider cell coverage than 4G mobile communication. In particular, it tries to increase communication sensitivity by greatly amplifying the power of the cell-edge user, and at this time, the peak-to-average power ratio (PAPR) performance of the waveform used in a physical layer is very important due to nonlinearity of the power amplifier and the problem of battery capacity.

In 5G mobile communication, discrete Fourier transform (DFT)-spread orthogonal frequency division multiplexing (OFDM) technology using a $\pi/2$-binary phase shift keying (BPSK) symbol to lower PAPR is included in uplink. However, since the $\pi/2$-BPSK symbol is an improper symbol, reception performance is degraded in case of using a linear receiver used in existing quadrature phase shift keying (QPSK) and QAM symbols. On the other hand, when using a widely linear receiver, the reception performance may be improved, but there is a disadvantage in that its computational complexity is very high. Also, in order to process a signal received by multiple antennas with the widely linear receiver, its complexity is very high compared to a single antenna.

The above information is presented as background information only to assist with an understanding of the disclosure. No determination has been made, and no assertion is made, as to whether any of the above might be applicable as prior art with regard to the disclosure.

SUMMARY

In case that a π/2-BPSK symbol with a low PAPR characteristic is used, due to the improper nature of BPSK, sufficient performance may be obtained only when a widely linear receiver is used. In particular, in case if using the π/2-BPSK symbol with the low PAPR characteristic in 5G mobile communication, due to the improper nature of BPSK, the sufficient performance may be achieved only when the widely linear receiver is used. In particular, in 5G mobile communication, several layers may be allocated to the same resource block (RB), and as a result, several symbols including the π/2-BPSK symbol may be mixed and simultaneously received in the same frequency band through multiple antennas.

In other words, it is possible to induce the widely linear receiver when one or more improper signals are introduced, but there is a disadvantage in that computational complexity is generally high. Also, as the number of multiple antennas increases, the computational complexity becomes very high to process the received signal at once, making it difficult to actually implement it.

Aspects of the disclosure are to address at least the above-mentioned problems and/or disadvantages and to provide at least the advantages described below. Accordingly, an aspect of the disclosure is to provide a receiver applicable to a signal including at least one or more π/2 phase shifted improper symbol (ex. π/2-BPSK, π/2-PAM) in a receiver using multiple antennas, a receiver capable of extremely reducing the computational complexity under a specific condition.

Additional aspects will be set forth in part in the description which follows and, in part, will be apparent from the description, or may be learned by practice of the presented embodiments.

In accordance with an aspect of the disclosure, a method for a reception device of a wireless communication system is provided. The method includes receiving orthogonal frequency division multiplexing (OFDM) signals through a plurality of antennas, arranging reception signal symbols included in the received reception signals, converting at least one quadrature phase shift keying (QPSK) symbol or quadrature amplitude modulation (QAM) symbol among the arranged reception signal symbols into π/2 phase shifted pulse amplitude modulation (PAM) symbols, estimating data symbols of the arranged reception signal symbols including at least one converted reception signal symbol, converting at least a part of the π/2 phase shifted PAM symbols among the estimated data symbols into the QPSK symbol or the QAM symbol by synthesizing, and determining the estimated data symbols including the converted QPSK symbol or the QAM symbol as a data symbol of the received signals.

Here, the arranging of reception signal symbols included in the received reception signals may arrange the reception signal symbols as a vector.

Here, the converting at least one QPSK symbol or QAM symbol among the arranged reception signal symbols into π/2 phase shifted PAM symbols, may further comprise arranging newly the reception signal symbols based on the converted π/2 phase shifted PAM symbols.

Here, the estimating data symbols of the arranged reception signal symbols including at least one converted reception signal symbol, may estimate the data symbols based on the arranged reception signal symbols and a conjugate value of the arranged reception signal symbols.

Here, the estimating data symbols of the arranged reception signal symbols including the at least one converted reception signal symbol may apply an inverse matrix of a matrix in which at least one matrix block includes a block diagonal matrix to a channel matrix of the reception signal symbols based on a designated condition.

Here, the designated conditions may indicate that in a following equation, $$\frac{M\phi}{2\pi} = k$$

(Herein, φ is a phase shift value that satisfies $\phi \in [0\pi]$, M is a number of assigned subcarriers satisfying $M \in N$, N is any natural number, and k is an integer) at least one symbol among the reception signals indicates a case where M satisfies a multiple of 4.

Here, the converting at least one QPSK symbol or QAM symbol among the arranged reception signal symbols into π/2 phase shifted PAM symbols may comprise substituting at least one QPSK symbol or QAM symbol among the arranged reception signal symbols so that a constellation rotation matrix is extracted, and determining at least a part of each of a real number part and an imaginary number part of the substituted QPSK symbol or QAM symbol with the π/2 phase shifted PAM symbols.

Here, the converting the π/2 phase shifted PAM symbol among the estimated data symbols into the QPSK symbol or the QAM symbol may comprise determining a real number part and an imaginary number part of the QPSK symbol or the QAM symbol before the conversion among the π/2 phase shifted PAM symbols of the estimated data symbols, and combining the real number part and the imaginary number part of the QPSK symbol or QAM symbol before the conversion.

Here, the determining the real number part and the imaginary number part of the QPSK symbol or the QAM symbol before the conversion among the π/2 phase shifted PAM symbols of the estimated data symbols, may further comprise applying the constellation rotation matrix to each of the real number part and the imaginary number part of the QPSK symbol or the QAM symbol before the conversion.

Here, the designated condition may indicate that the received reception signals include at least one π/2-BPSK symbol.

In accordance with aspect of the disclosure, a reception device of a wireless communication system is provided. The reception device includes at least one receiver that receives orthogonal frequency division multiplexing (OFDM) signals through a plurality of antennas, at least one processor functionally coupled to the at least one receiver, and a storage unit for storing a processing result of the processor, wherein the at least one processor may be configured to arrange reception signal symbols included in the received reception signals, and convert at least one quadrature phase shift keying (QPSK) symbol or quadrature amplitude modulation (QAM) symbol among the arranged reception signal symbols into π/2 phase shifted pulse amplitude modulation (PAM) symbols, estimate data symbols of the arranged reception signal symbols including the at least one converted reception signal symbol, convert at least a part of the π/2 phase shifted PAM symbols among the estimated data symbols into the QPSK symbol or the QAM symbol by synthesizing, and determine the estimated data symbols including the converted QPSK symbol or the QAM symbol as a data symbol of the received signals.

Here, the at least one processor may be configured to may arrange, the reception signal symbols as a vector.

Here, the at least one processor may be configured to in converting at least one QPSK symbol or QAM symbol among the arranged reception signal symbols into π/2 phase shifted PAM symbols, arrange newly, the reception signal symbols based on the converted π/2 phase shifted PAM symbols.

Here, the at least one processor may be configured to estimate, the data symbols based on the arranged reception signal symbols and a conjugate value of the arranged reception signal symbols.

Here, the at least one processor may be configured to, in estimating data symbols of the arranged reception signal symbols including the at least one converted reception signal symbol, apply, an inverse matrix of a matrix in which at least one matrix block includes a block diagonal matrix to a channel matrix of the reception signal symbols based on a designated condition.

Here, the designated conditions may indicate that in a following equation, $$\frac{M\phi}{2\pi} = k$$

(Herein, φ is a phase shift value that satisfies φ∈[0π], M is a number of assigned subcarriers satisfying M∈N, N is any natural number, and k is an integer) at least one symbol among the reception signals indicates a case where M satisfies a multiple of 4.

Here, the at least one processor may be configured to, in converting at least one QPSK symbol or QAM symbol among the arranged reception signal symbols into π/2 phase shifted PAM symbols, substitute at least one QPSK symbol or QAM symbol among the arranged reception signal symbols so that a constellation rotation matrix is extracted, and determine at least a part of each of a real number part and an imaginary number part of the substituted QPSK symbol or QAM symbol with the π/2 phase shifted PAM symbols.

Here, the at least one processor, in converting the π/2 phase shifted PAM symbol among the estimated data symbols into the QPSK symbol or the QAM symbol, may determine the real number part and the imaginary number part of the QPSK symbol or the QAM symbol before the conversion among the π/2 phase shifted PAM symbols of the estimated data symbols, and may combine the real number part and the imaginary number part of the QPSK symbol or QAM symbol before the conversion.

Here, the at least one processor, in determining a real number part and an imaginary number part of the QPSK symbol or the QAM symbol before the conversion among the π/2 phase shifted PAM symbols of the estimated data symbols, may apply the constellation rotation matrix to each of the real number part and the imaginary number part of the QPSK symbol or the QAM symbol before the conversion.

Here, the designated condition may indicate that the received reception signals include at least one π/2-BPSK symbol.

According to various embodiments of the disclosure, in case that a specific parameter condition is satisfied, a widely linear receiver can be implemented very simply when a signal received by multiple antennas is a DFT-spread OFDM signal using at least one or more π/2-BPSK symbols or π/2-PAM symbols.

In this disclosure, in case that the specific parameter condition is satisfied, the implementation complexity of the existing widely linear receiver for multiple antennas can be drastically reduced, by reflecting a characteristic of a signal including an improper symbol and a linear phase shift characteristic.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
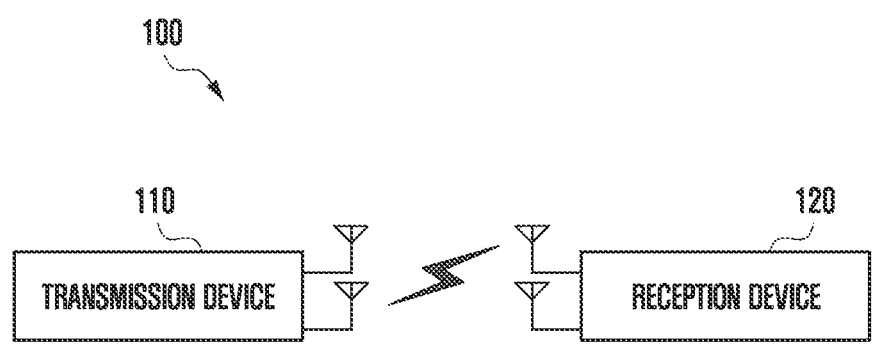
FIG. 1 illustrates a wireless communication environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing an embodiment of the disclosure, a description of technical content that is well known in the technical field to which the disclosure belongs and is not directly related to the disclosure is omitted. This is to more clearly convey the gist of the disclosure without obscuring it by omitting unnecessary description.

For the same reason, some components may be exaggerated, omitted, or schematically illustrated in the accompanying drawing. Also, a size of each component does not fully reflect the actual size. The same or corresponding components in each drawing are assigned the same reference number.

An advantage and a feature of the disclosure and a method for achieving them may become apparent with reference to the embodiments described below in detail together with the accompanying drawing. The disclosure is not limited to the embodiments disclosed below, and may be implemented in different various forms, and only the embodiments are provided to make the disclosure of the disclosure complete, and to completely inform the scope of the disclosure to those skilled in the art to which the disclosure belongs, and the disclosure is only defined by the scope of the claim. Throughout the specification, the same reference numeral may refer to the same component.

In this case, it will be able to be understood that each block of processing flow chart drawings and combinations of flow chart drawings may be performed by computer program instructions. Since these computer program instructions may be mounted on a processor of a general-purpose computer, a special-purpose computer, or other programmable data processing equipment, the instructions performed through the processor of the computer or the other programmable data processing equipment create a means to perform the functions described in the flow chart block(s). Since these computer program instructions may also be stored in computer-usable or computer-readable memory that may be oriented toward the computer or the other programmable data processing equipment to implement the function in a particular way, the instructions stored in the computer-usable or computer-readable memory may also produce a manufacturing item containing the instruction means that perform the function described in the flow chart block(s). Since the computer program instructions may also be mounted on the computer or the other programmable data processing equipment, instructions in which a series of operational steps are performed on the computer or the other programmable data processing equipment and creates a computer-executed process and performs the computer or the other programmable data processing equipment, may also provide steps for executing the functions described in the flow chart block(s).

Also, each block may represent a module, segment, or a part of code including one or more executable instructions for executing a specific logical function(s). Also, it should also be noted that in some alternative implementations, it may be possible for the functions mentioned in the blocks to occur out of order. For example, two blocks illustrated in succession may actually substantially be performed at the same time, or the blocks may sometimes be performed in reverse order according to the corresponding function.

In this case, the term 'unit' used in an embodiment of the disclosure means a software or a hardware component such as field programmable gate array (FPGA) or application-specific integrated circuit (ASIC), and the 'unit' may perform specific roles. However, 'unit' may not mean limited to the software or the hardware. The 'unit' may be configured to be in an addressable storage medium and may be configured to play one or more processors. Thus, as an example, the 'unit' includes components such as software components, object-oriented software components, class components, and task components, processes, functions, attributes, procedures, subroutines, program code segments, drivers, firmware, microcode, circuit, data, database, data structures, tables, arrays, and variables. The functions provided within the components and the 'unit' may be combined into the smaller numbers of components and 'units' or may further be separated into the additional components and 'units'. Also, the components and the 'units' may be implemented to play one or more CPUs in a device or a secure multimedia card. Also, in an embodiment, the 'units' may include one or more processors.

Hereinafter, for the convenience of description, the disclosure uses terms and names defined in the standard for 5G, New Radio (NR), and Long Term Evolution (LTE) systems. However, the disclosure is not limited by the terms and the names, and may be equally applied to systems conforming to another standard. For example, it is obvious that it may be applied to a sixth generation (6G) or pre-6G communication system, which is a communication system after 5G.

A term referring to a signal, a term referring to a component of a device, and the like, which are used in the following description, are illustrated for convenience of description. Thus, the disclosure is not limited to the terms described below, and another term having an equivalent technical meaning may be used.

Also, various embodiments are described in the description by using terms used in some communication standards (e.g., 3rd Generation Partnership Project, (3GPP)), but this is only an example for explanation and may be easily modified and applied to the same or similar operation in another communication system.

Hereinafter, the disclosure relates to a method and device for processing a signal received in a wireless communication system. Specifically, the disclosure may improve signal processing efficiency by receiving a wireless signal through a plurality of antennas and processing the received wireless signal by using a receiver with a remarkably low computational complexity.

As an embodiment for this, the receiver may include a widely linear minimum mean squared-error (MMSE) estimator for low-complexity implementation, which will be described in detail with reference to the drawings.

FIG. 1 illustrates a wireless communication environment according to an embodiment of the disclosure.

Referring to FIG. 1, a transmission device 110 and a reception device 120 are illustrated as parts of nodes using a wireless channel in a wireless communication environment 100. According to an embodiment, the transmission device 110 or the reception device 120 may be a device configured to process an orthogonal frequency division multiplexing (OFDM) signal.

The transmission device 110 may be configured including at least one antenna and a transmitter. At this time, the transmission device 110 may transmit a wireless signal to the reception device 120 through the wireless channel.

The reception device 120 may be configured including a plurality of antennas and a receiver. However, the reception device 120 may be a device including the transmitter as well as the receiver, and may operate as a transmission device that transmits a signal. In other words, the reception device 120 may not only transmit control information (e.g., channel information) to the transmission device, but may also transmit data as necessary.

Similarly, the transmission device 110 may be configured including the receiver and may receive a wireless signal from at least one other transmission device. In case that the transmission device 110 is configured including the receiver and the plurality of antennas, it is obvious that the transmission device 110 may operate as the reception device 120 of the disclosure.

According to the above, the transmission device 110 configured including the transmitter and the reception device 120 configured including the receiver may be configured further including the receiver and the transmitter, respectively. Also, the transmitter or receiver is a named configuration according to its function and may be expressed as a communication unit.

In various embodiments of the disclosure, the transmission device 110 or the reception device 120 is only named according to the function of the role mainly performed, and may all be referred to as an electronic device. According to various embodiments of the disclosure, the electronic device may be configured including a terminal, 'user equipment (UE)', 'mobile station', 'subscriber station', 'remote terminal', 'wireless terminal', 'user device', 'base station', 'access point (AP)', 'eNodeB (eNB)', '5th generation node (5G node)', 'wireless point', 'transmission/reception point (TRP)', or may include at least one of other terms having an equivalent technical meaning, or may be configured as at least one. The electronic device may be configured with devices included in the category of a wireless communication device.

According to an embodiment, when downlink communication, the transmission device 110 may be the base station and the reception device 120 may be the terminal. As another example, when uplink communication, the transmission device 110 may be the terminal and the reception device 120 may be the base station. Also, when device to device (D2D) communication, the transmission device 110 may be the terminal and the reception device 120 may be another terminal. Here, the D2D communication may be referred to as sidelink communication. Also, the transmission device 110 may be the base station, and the reception device 120 may be another base station. In some embodiments, the transmission device 110 and the reception device 120 may perform signaling through a backhaul. The backhaul may be a wireless backhaul. Also to the listed examples, the transmission device 110 and the reception device 120 may be various devices capable of transmitting and receiving signals.

The base station is a network infrastructure that provides wireless access to the terminal. The base station may be referred to as an 'access point (AP)', 'eNodeB (eNB)', '5$^{th}$ generation node (5G node)', '5G NodeB (NB)', 'wireless point', 'transmission/reception point (TRP)', or another term having an equivalent technical meaning Also to the base station.

The terminal is a device used by a user and perform communication with the base station through the wireless channel. In some cases, the terminal may be operated without user involvement. In other worlds, the terminal is a device that performs machine type communication (MTC) and may or may not be carried by the user. The terminal may be referred to as 'user equipment (UE)', 'mobile station', 'subscriber station', 'remote terminal', 'wireless terminal', 'user device', or another term having an equivalent technical meaning Also to the terminal.

Figure 2:
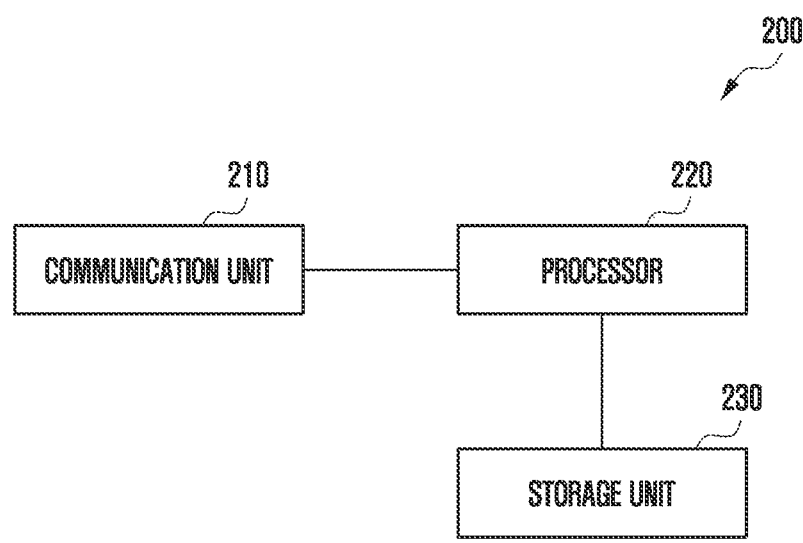
FIG. 2 illustrates a configuration of an electronic device in a wireless communication system according to an embodiment of the disclosure.

FIG. 2 illustrates a configuration of an electronic device in a wireless communication system according to an embodiment of the disclosure.

According to an embodiment, the configuration of an electronic device 200 illustrated in FIG. 2 may be understood as a configuration of the reception device 120.

Referring to FIG. 2, an electronic device 200 may include a reception device 120 the reception device 120 may include a communication unit 210, a processor 220, and a storage unit 230.

The communication unit 210 may perform operations for receiving a signal through a wireless channel. When receiving the signal, the communication unit 210 may down-convert a RF band signal received through antenna into a baseband signal, and may restore received bit strings through demodulation and decoding of the baseband signal. To this end, according to an embodiment, the communication unit 210 may include a decoder, a demodulator, an analog to digital convertor (ADC), a reception filter, an amplifier, a mixer, an oscillator, and the like.

Also, in case that the communication unit 210 includes a transmission function as described above, the communication unit 210 may perform a conversion function between a baseband signal and a bit sequence according to a physical layer standard of the system. For example, when transmitting control information, the communication unit 210 may generate modulation symbols by encoding and modulating a transmission bit string. Also, the communication unit 210 may up-convert the baseband signal to a radio frequency (RF) band signal and then may transmit the same through the antenna. To this end, according to an embodiment, the communication unit 210 may include an encoder, a modulator, a digital to analog convertor (DAC), a transmission filter, and the like.

The communication unit 210 may include a plurality of antennas, and may receive a plurality of streams through each of the plurality of antennas. Also, the communication unit 210 may include a plurality of RF chains and may perform beamforming.

For the beamforming, the communication unit 210 may adjust the phase and size of each signals transmitted and received through a plurality of antennas or antenna elements, in other words, may perform analog beamforming, or may perform beamforming for digital signals, in other words, may perform digital beamforming.

Also, the communication unit 210 may include different communication modules to process signals in different frequency bands. Furthermore, the communication unit 210 may include a plurality of communication modules to support a plurality of different wireless access technologies. For example, the different wireless access technologies may include Bluetooth low energy (BLE), Wireless Fidelity (Wi-Fi), Wi-Fi Gigabyte (WiGig), cellular network (e.g., LTE, LTE-advanced (LTE-A), and 5th generation (5G) network), and the like. Also, the different frequency bands may include a super high frequency (SHF) (e.g., 2.5 GHz, 5 GHz) band and a millimeter wave (e.g., 30 GHz, 60 GHz) band.

The communication unit 210 transmits and receives the signal as described above. Accordingly, the communication unit 210 may be referred to as a transmitter, a receiver, or a transceiver. Also, in the following description, transmission and reception performed through the wireless channel are used as a meaning including performing the processing as described above by the communication unit 210.

According to various embodiments, the communication unit 210 may receive the signal for channel estimation. Also, the communication unit 210 may feedback channel information (e.g., channel state information (CSI)) generated by the processor 220 to be described later to another device (e.g., the transmission device 110 of FIG. 1). Also, the communication unit 210 may receive data generated according to channel information fed back to another device.

Also, through the communication unit 210, the reception device 120 may perform signaling for determining a reception technique with the transmission device 110. For example, through signaling, at least one of information on the coded modulation method, information on the bit-to-symbol mapping method, information indicating the degree of change for the channel, and information indicating a channel correlation of a MIMO channel may be exchanged.

In performing operations according to various embodiments of the disclosure, at least some of the operations of the communication unit 210 may be controlled by the processor 220 to be described below. At this time, at least a part of the processor 220 may be configured included in the communication unit 210. The processor 220 may control overall operations of the reception device 120. For example, the processor 220 may transmit and receive the signal through the communication unit 210. According to a further embodiment, the processor 220 may receive a control signal from at least one transmission device, may process the received control signal to generate channel information (e.g., channel state information (CSI)) for each transmission device, and may feedback the generated channel information to the transmission device.

Also, the processor 220 may write and read data in the storage unit 230. To this end, the processor 220 may include at least one processor or microprocessor, or may be configured as a part of the processor. Also, a part of the communication unit 210 and the processor 220 may be referred to as a communication processor.

The processor 220 may be operably coupled with the communication unit 210 and the storage unit 230. The processor 220 may process operations of the reception device 120 according to various embodiments by controlling the communication unit 210 and a memory (e.g., storage unit 230).

According to an embodiment of the disclosure, the processor 220 may perform the operation of the communication unit 210 or may control the communication unit 210 to operate. At this time, the processor 220 may be configured independently of the communication unit 210, but may be configured included in the communication unit 210 as described above. In case that the processor 220 is configured included in the communication unit 210, the processor 220 may be additionally configured outside the communication unit 210.

The storage unit 230 may store data such as a basic program, an application program, setting information, and the like, which are for operation of the reception device 120. The storage unit 230 may be configured with a volatile memory, a non-volatile memory, or a combination of the volatile memory and the non-volatile memory. Also, the storage unit 230 may provide stored data according to a request of the processor 220. According to various embodiments, the memory (e.g., storage unit 230) may store precoders in order to feed back the channel information to the transmission device 110.

Although the electronic device 200 of FIG. 2 has described the configuration of the reception device 120 as an example, it has been described that the communication unit 210 may be configured including the transmitter as well as the receiver. At this time, in case that the reception device 120 is a configuration of the base station, a backhaul communication unit that provides an interface for performing communication with a backhaul network may be further included.

Similarly, according to various embodiments of the disclosure, in case that the communication unit 210 of the electronic device 200 is configured including the transmitter, it is obvious that it may be applied to the transmission device 110 as well.

Figure 3:
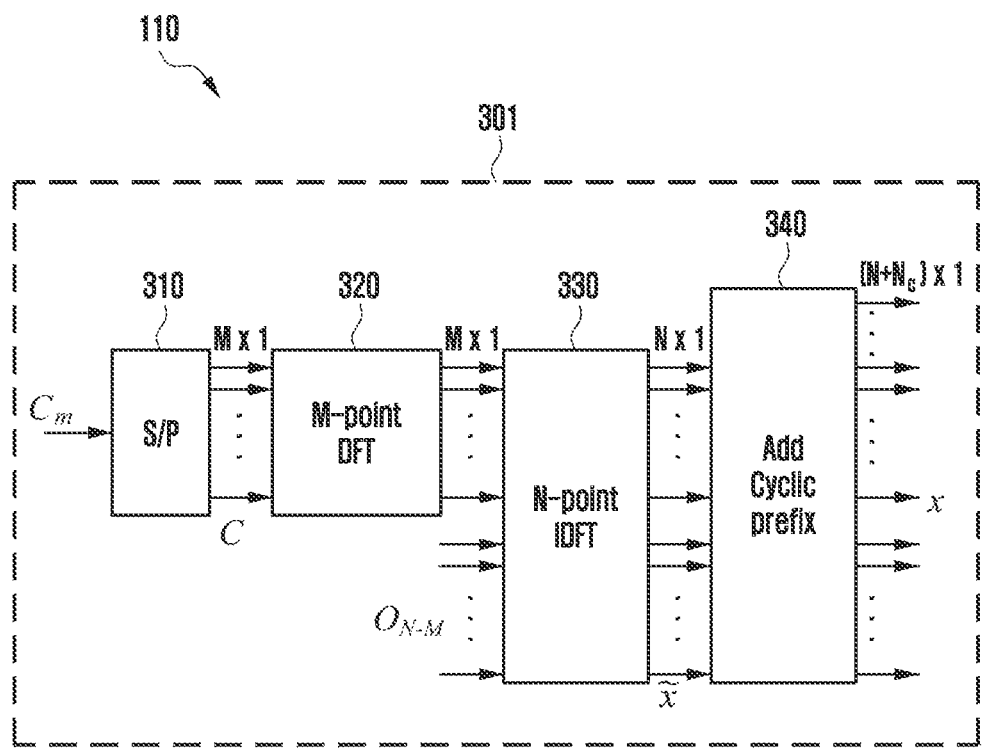
FIG. 3 illustrates a configuration of a communication unit including a transmitter of an electronic device in a wireless communication system according to an embodiment of the disclosure.

FIG. 3 illustrates a configuration of a communication unit including a transmitter of an electronic device in a wireless communication system according to an embodiment of the disclosure.

Referring to FIG. 3, the communication unit 210 of an electronic device 200 may be configured to include at least one transmitter 301. The transmitter 301 may be configured a device that generates $\pi/2$ phase shifted binary phase shift keying (BPSK) (hereinafter, $\pi/2$-BPSK) symbol, $\pi/2$ phase shifted pulse amplitude modulation (PAM) (hereinafter, $\pi/2$-PAM) symbol, quadrature phase shift keying (QPSK) symbol, or quadrature amplitude modulation (QAM) symbol. For example, it may be a transmitter configuration included in the communication unit of a transmission device 110 or a reception device 120.

According to an embodiment, the transmitter 301 may include a DFT-spread OFDM transmitter structure. For example, the transmitter 301 may be configured including a serial/parallel (s/p) conversion unit 310, a first modulation unit 320, a second modulation unit 330, and a code generation unit 340.

The s/p conversion unit 310 converts inputted data into parallel data signals. In this case, the s/p conversion unit 310 may separate the inputted data by using an algorithm determined according to the type of data and spatial modulation rate, and the like.

The first modulation unit 320 may generate modulation symbols by modulating parallel data signals inputted as a data modulator, the second modulation unit 330 may generate an OFDM symbol by selecting a channel symbol function corresponding to the modulation symbol as a channel modulator.

According to FIG. 3, the first modulation unit 320 and the second modulation unit 330 are illustrated as performing M-point DFT and N-point IDFT, respectively, but are not limited thereto and may generate a modulation signal according to various methods. For example, it may be configured to generate π/2-BPSK, π/2-PAM, QPSK, or QAM symbols through the first modulation unit 320 and the second modulation unit 330.

Also, the transmitter 301 describes a modulation unit which is configured with the first modulation unit 320 and the second modulation unit 330, but it may be configured including one modulation unit or three or more modulation units.

The code generation unit 340 may generate and insert a cyclic code (e.g., a cyclic prefix (CP)) for maintaining subcarrier orthogonality of the OFDM transmission method, and may transmit a signal through an antenna.

According to an embodiment, the signal transmitted through the transmission device 110 may include a signal to which frequency domain spectrum shaping (FDSS) is applied.

Figure 4:
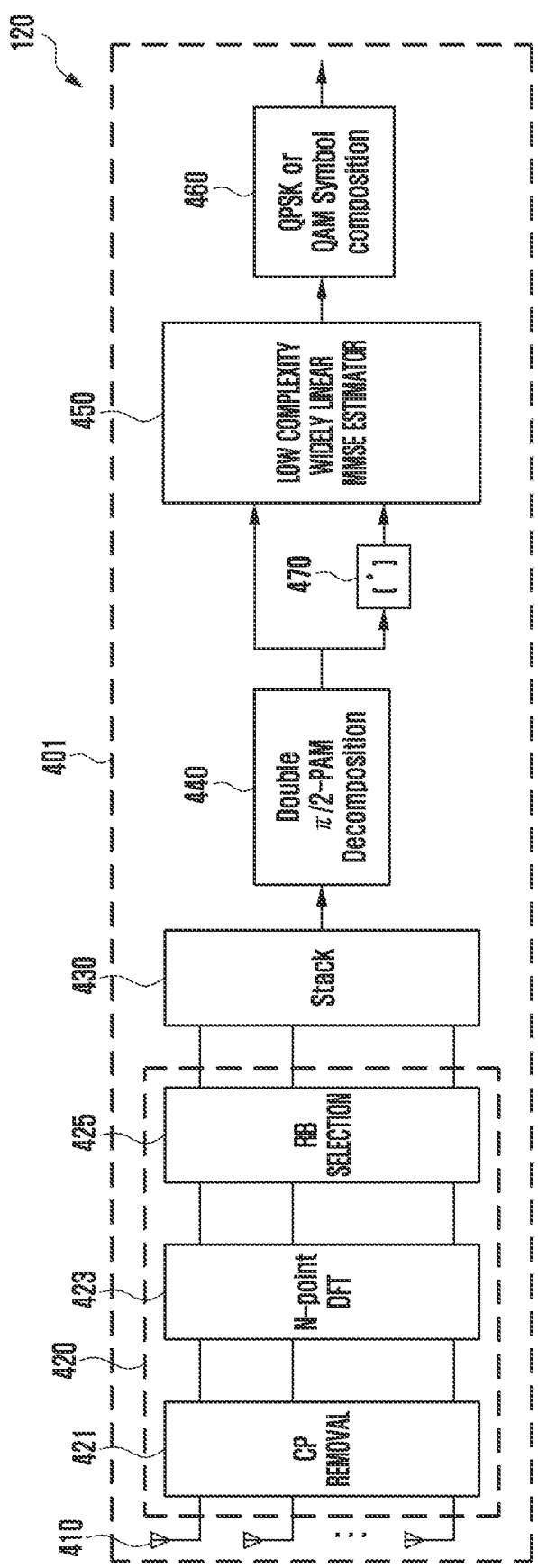
FIG. 4 illustrates a configuration of a communication unit including a receiver of an electronic device in a wireless communication system according to an embodiment of the disclosure.

FIG. 4 illustrates a configuration of a communication unit including a receiver of an electronic device in a wireless communication system according to an embodiment of the disclosure.

Referring to FIG. 4, it may be described as an operation of a reception device 120 that receives a signal transmitted from at least one transmission device 110. At this time, the communication unit of the reception device 120 may be configured including at least one receiver 401. The receiver 401 receives the signal transmitted from at least one transmitter through a plurality of antennas. At this time, the receiver 401 may be configured as a receiver that processes a OFDM symbol. For example, the receiver 401 may be configured to process at least one symbol of π/2-BPSK, π/2-PAM, linear phase shifted BPSK, linear phase shifted PAM, QPSK, or QAM. For example, the receiver 401 may be a receiver configuration included in the communication unit of the transmission device 110 or the reception device 120.

According to an embodiment, the receiver 401 may be configured including a DFT-spread OFDM receiver structure. For example, the receiver 401 may configured including at least one antenna 410, a preprocessing unit 420, an alignment unit 430, a decomposition unit 440, an estimation unit 450, and a coupling unit 460.

According to an embodiment, the at least one antenna 410 may receive the signal transmitted from at least one transmission device 110. At this time, a plurality of antennas 410 may be included in the reception device 120, and a signal transmitted from the transmission device 110 may be received through at least one of the plurality of antennas included in the reception device 120.

The preprocessing unit 420 performs an operation of processing the received signal to enable channel estimation. According to an embodiment, the preprocessing unit 420 may include at least one component among a code removal unit 421 that removes the CP of the received signal, a modulation unit 423 that performs N-point DFT, and a selection unit 425 that determines a resource block (RB). The received signal may be processed as a vector component for use in symbol estimation through the preprocessing unit 420. For example, the preprocessing unit 420 may output symbols included in reception signals received through the antenna as the vector component.

The alignment unit 430 may align a symbol of the reception signal. At this time, the alignment unit 430 generates an aligned vector by arranging (or overlapping, stacking) the vector component of the reception signal symbols, and the decomposition unit 440 may perform a decomposition for converting each of the aligned vector components into a specific symbol.

According to an embodiment, the decomposition unit 440 may convert a QPSK or QAM symbol into a BPSK or PAM symbol by performing π/2-PAM decomposition.

The estimation unit 450 performs the symbol estimation on the aligned symbols including the converted symbols. At this time, the estimation unit 450 may estimate a BPSK or PAM symbol based on a low complexity widely linear MMSE estimator proposed according to a further embodiment of the disclosure. At this time, aligned symbols and their conjugate values may be inputted to the estimation unit 450, and a conjugate operation unit 470 may be included for this purpose.

The coupling unit 460 may estimate a symbol vector of the reception signal by synthesizing the QPSK or QAM symbol from the estimated BPSK or PAM symbol.

By applying the low complexity widely linear MMSE estimator according to an embodiment of the disclosure described above, the reception device 120 may significantly reduce computational complexity, and thus may quickly perform data symbol estimation of the signal. Hereinafter, signal reception of the reception device 120 will be described in detail through drawings and equations.

Figure 5:
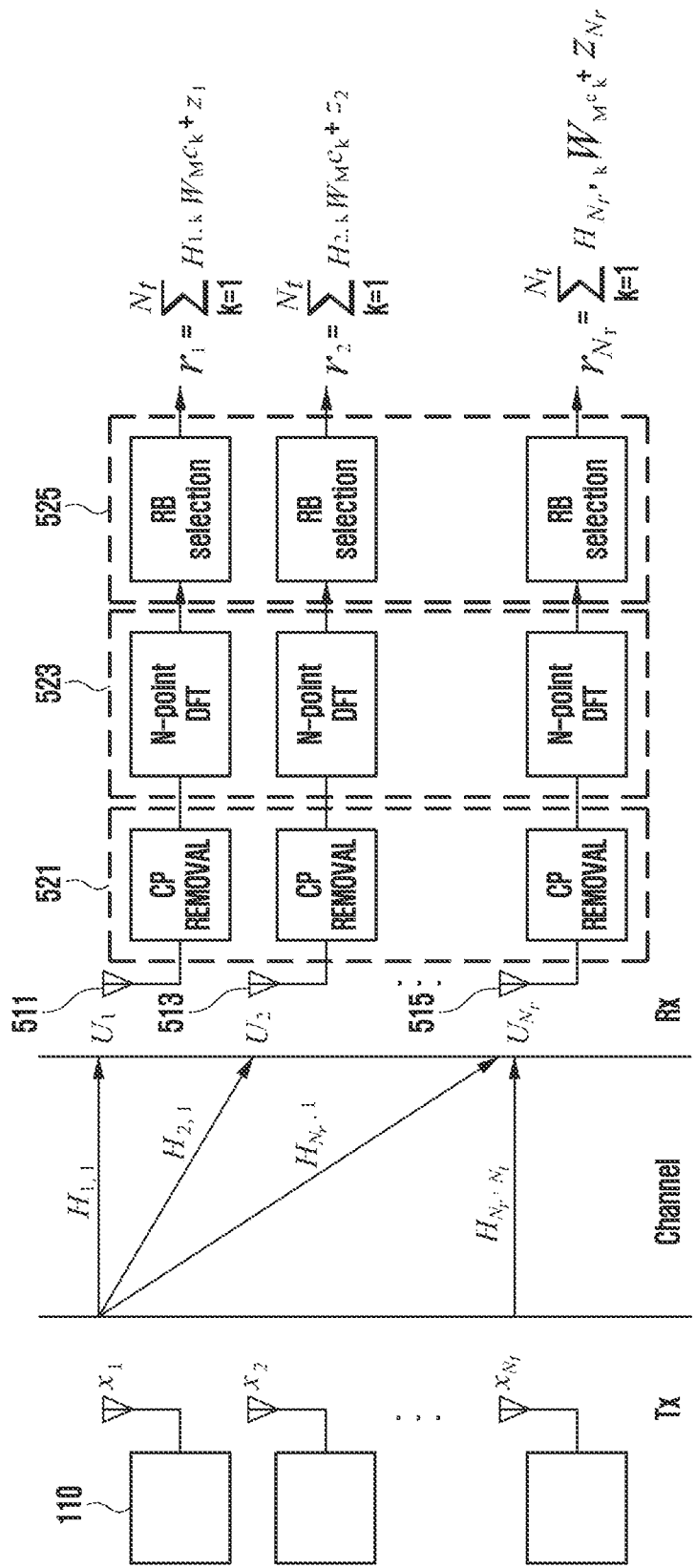
FIG. 5 illustrates a reception operation of a signal transmitted from a transmission device in a reception device according to an embodiment of the disclosure.

FIG. 5 illustrates a reception operation of a signal transmitted from a transmission device in a reception device according to an embodiment of the disclosure.

According to an embodiment, a signal received by the reception device 120 may be expressed as Equation 1.

$$Y = HX + Z \qquad \text{Equation 1}$$

Here, Y represents a signal received by the reception device 120, and X represents a signal transmitted by the transmission device 110. Here, in order to reduce a peak-to-average power ratio (PAPR), the transmission device 110 may transmit the signal X by applying FDSS to the signal as described above.

H represents a channel between the transmission device 110 and the reception device 120. Z represents noise between channels. In case that the transmission device 110 has $N_t$ number of antennas and the reception device 120 has $N_r$ number of antennas, X may be a vector of size $N_t \times 1$, Y and Z may be vectors of size $N_r \times 1$, and H may be a matrix of size $N_r \times N_t$.

According to various embodiments of the disclosure, a low complexity widely linear MMSE estimator and a low complexity widely linear receiver including the same may be proposed for estimating a signal X more effectively.

Figure 11:
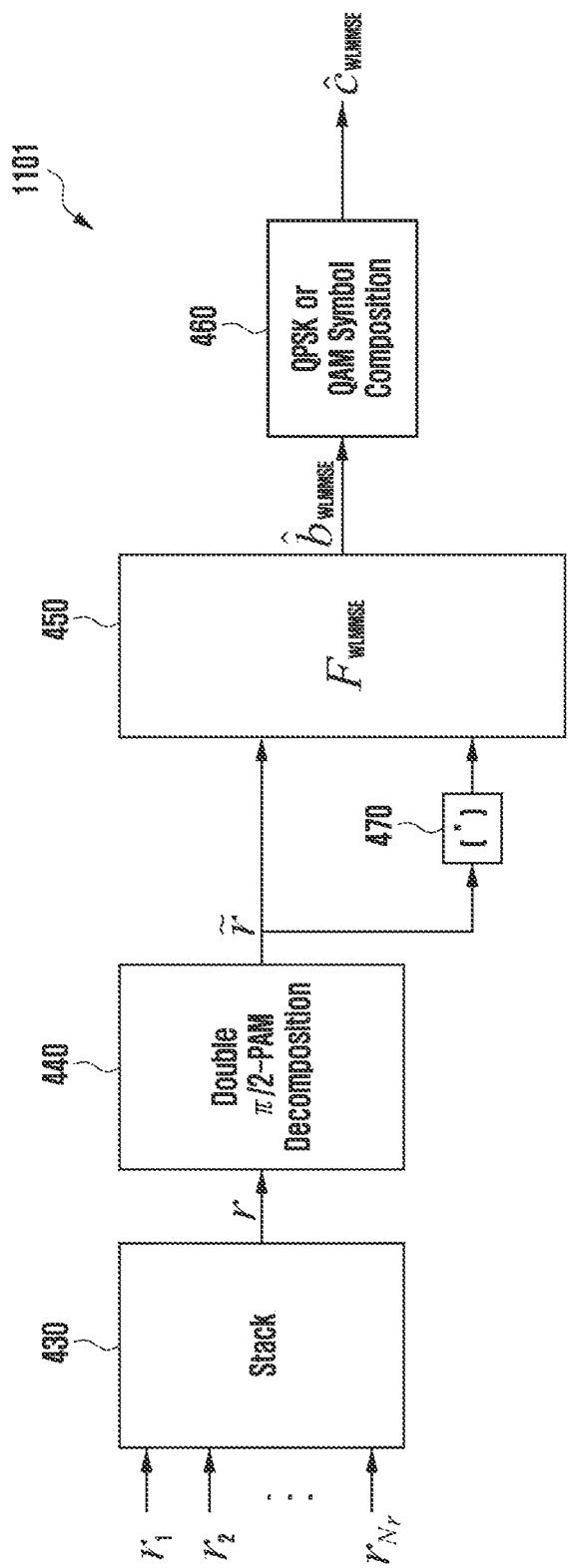
FIG. 11 illustrates a main configuration of a receiver of a reception device according to an embodiment of the disclosure.

In general, a widely linear receiver is very complicated because it calculates the inverse matrix of the $2MN_r \times 2MN_r$ matrix to apply to the channel matrix H of the reception signal, in order to estimate the signal transmitted by the transmission device 110. Also, as shown in FIG. 11, there is a very large difference in the number of multiplications for calculating the inverse matrix.

On the other hand, the low complexity widely linear MMSE estimator proposed in the disclosure is provided to perform M inverse matrix calculations of the matrix of size $2N_r-K \times 2N_r-K$, in order to apply to the channel matrix H of the reception signal, so that the complexity of calculating the inverse matrix of the channel matrix H may be very low.

According to an embodiment, in order to apply the low complexity widely linear MMSE estimator, it is necessary to satisfy the condition that k in Equation 2 is an integer.

$$\frac{M\phi}{2\pi} = k \qquad \text{Equation 2}$$

Here, φ is a phase shift value that satisfies φ∈[0π], for example, φ=π/2 in the case of π/2-BPSK, M is the number of assigned sub-carriers that satisfy M∈N (N is any natural number). Here, the phase shift satisfying φ∈[0π] may include a linear phase shift.

For example, in the case of π/2-BPSK considered in 5G, the constellation rotation angle φ=π/2. Applying this, M to satisfy the condition that k is an integer is a multiple of 4, and the case that the number of assignable subcarriers is a multiple of 12 when the constellation rotation angle φ=π/2 is included, so the conditions for applying the low complexity widely linear MMSE estimator may be satisfied.

To this end, the reception device 120 may check the modulation method of symbols whether the received signals are modulated based on at least one designated modulation scheme among various modulation schemes.

For example, in case that the reception device 120 is a base station, the reception device 120 may check whether a symbol included in the reception signal is a π/2-BPSK, π/2-PAM, QPSK, or QAM symbol, based on the pilot signal received from the transmission device 110. On the other hand, in case that the reception device 120 is a terminal, the reception device 120 may check whether a symbol included in the reception signal is a π/2-BPSK, π/2-PAM, QPSK, or QAM symbol based on control information of the signal received from the transmission device 110.

In other words, in this disclosure, in case that the signal transmitted and received between the transmission device 110 and the reception device 120 use π/2-BPSK, π/2-PAM, QPSK, or QAM symbol, it is possible to provide a receiver (hereinafter, low complexity widely linear receiver) including the low complexity widely linear MMSE estimator in which computational complexity is significantly reduced.

As described above, looking at the result of processing the signal received through each of a plurality of antennas 511, 513, . . . , 515 through the preprocessing unit 420 as a symbol unit, it may be expressed as in Equation 3.

$$r_i = \sum_{k=1}^{N_t} H_{i,k} W_M c_k + z_i \quad \text{Equation 3}$$

$r_i$ is a symbol vector after a signal received through the i-th reception antenna of the reception device 120 is processed through the preprocessing unit 420. According to an embodiment, the reception signal symbol after an operation of CP removal (521), N-point DFT (523), and RB selection (525) is performed on symbols included in the received signal may be expressed as a vector.

$c_k$ is the symbol vector of M×1 data in the k-th transmission antenna. Here, the k-th transmission antenna may be an antenna of the k-th transmission device, may be an k-th antenna in one transmission device, or may be a number arbitrarily divided for a plurality of antennas.

$H_{i,k}$ is the M×M channel matrix between the k-th transmission antenna and the i-th reception antenna.

$z_i$ is the noise vector in the i-th reception antenna.

The reception device 120 may perform symbol estimation based on symbol vectors determined through the selection unit 425. To this end, the reception device 120 may align the determined symbol vectors.

Figure 6:
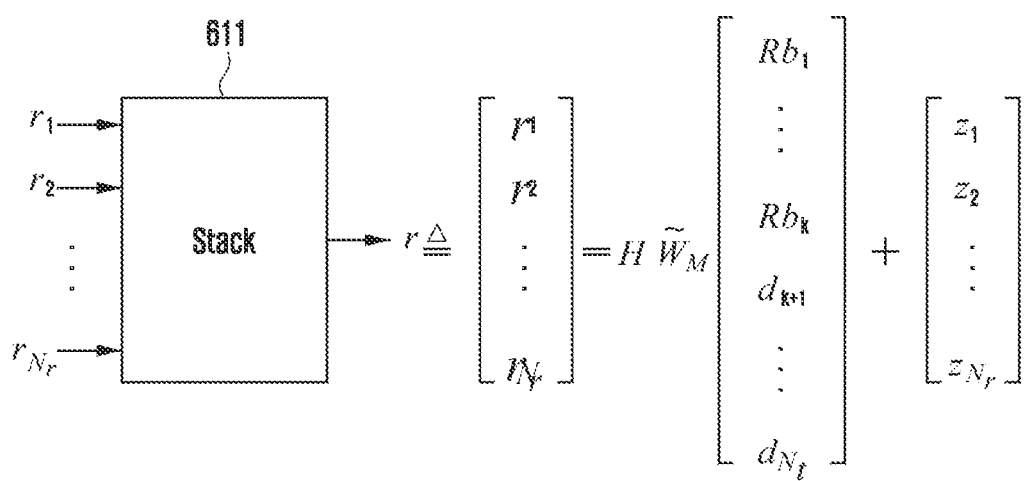
FIG. 6 illustrates arranging signals in a reception device according to an embodiment of the disclosure.

FIG. 6 illustrates arranging signals in a reception device according to an embodiment of the disclosure.

Referring to FIG. 6, a reception device 120 may align a pre-processed symbol vector through an alignment unit 430.

According to an embodiment, the alignment unit 430 may stack (611) inputted signals $r_1, r_2, \ldots$ and $r_{N_r}$ into one long vector (transverse direction or column direction). According to an embodiment, the alignment unit 430 may generate an aligned vector by sequentially arranging the symbol vectors of the inputted received signal, or may generate an aligned vector by classifying it according to the modulation method of the symbol. Alternatively, the alignment unit 430 may align the symbol of the reception signal by classifying them according to the reception antenna for receiving the signal or the transmission antenna of the signal identified from the reception signal. Here, generating the aligned vector may be storing each signal in a storage unit 230 as a vector. The aligned symbols of the reception signal may be processed through a vector matrix operation in subsequent operations.

The aligned vector r may be expressed as Equation 4.

$$r \triangleq \begin{bmatrix} r_1 \\ r_2 \\ \vdots \\ r_{N_r} \end{bmatrix} = H\tilde{W}_M \begin{bmatrix} Rb_1 \\ \vdots \\ Rb_k \\ d_{K+1} \\ \vdots \\ d_{N_t} \end{bmatrix} + \begin{bmatrix} z_1 \\ z_2 \\ \vdots \\ z_{N_r} \end{bmatrix} \quad \text{Equation 4}$$

Here, $N_t$ is the number of transmission antenna component satisfying $N_t \in N$, $N_r$ is the number of reception antenna components satisfying $N_r \in N$, K is the number of π/2-BPSK symbol vector satisfying $K \in N$ and it is $b_k$ in the case of an improper symbol and $d_k$ in the case of a proper symbol. Here, the improper symbol may be defined to include a π/2 phase shifted signal such as π/2-BPSK, π/2-PAM, and the like, and the proper symbol may be defined to include QPSK or QAM.

The channel matrix H of Equation 4 may be expressed as Equation 5.

$$H \triangleq \begin{bmatrix} H_{1,1} & H_{1,2} & \ldots & H_{1,N_t} \\ H_{2,1} & H_{2,2} & \ldots & H_{2,N_t} \\ \vdots & \vdots & \ddots & \vdots \\ H_{N_r,1} & H_{N_r,2} & \ldots & H_{N_r,N_t} \end{bmatrix} \quad \text{Equation 5}$$

Here, each block component of the channel matrix H is an M×M diagonal matrix, and $H_{i,j}$ is an M×M channel diagonal matrix between the j-th transmission antenna and the i-th reception antenna.

$\tilde{W}_M$ of Equation 4 may be expressed as Equation 6.

$$\tilde{W}_M \triangleq \begin{bmatrix} W_M & 0_{M-by-M} & \ldots & 0_{M-by-M} \\ 0_{M-by-M} & W_M & \ldots & 0_{M-by-M} \\ \vdots & \vdots & \ddots & \vdots \\ 0_{M-by-M} & 0_{M-by-M} & \ldots & W_M \end{bmatrix} = I_{N_t} \otimes W_M \quad \text{Equation 6}$$

$W_M$ is the M×M DFT matrix, $I_M$ is the M×M unit matrix, and $O_{M-by-M}$ is the M×M all zero matrix.

The constellation rotation matrix of Equation 4 is as shown in Equation 7.

$$R = \text{diag}\{e^{j\frac{\pi}{2} \cdot 0}, e^{j\frac{\pi}{2} \cdot 1}, \ldots, e^{j\frac{\pi}{2} \cdot (M-1)}\} \quad \text{Equation 7}$$

According to Equation 7, the constellation rotation matrix R may be configured with an M×M diagonal matrix having a pattern of 1, j, −1, −j, 1, . . . .

In this case, the channel matrix H may include an effect of the FDSS of the transmitter. For convenience, the first K symbol vectors are improper symbols, and the remaining $N_t$-K are QPSK or QAM symbols.

Symbol estimation according to an embodiment of the disclosure includes a low complexity widely linear MMSE estimator of case that the received signal satisfies Equation 1, so an operation of processing symbol conversion of the received signal may be performed.

The reception device 120 may convert symbol vectors that are QPSK or QAM symbols.

Figure 7:
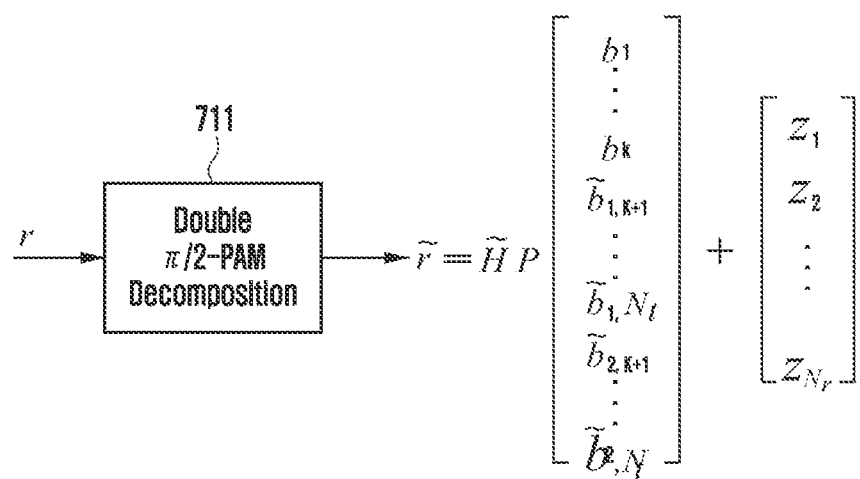
FIG. 7 illustrates converting a symbol of a signal in a reception device according to an embodiment of the disclosure.

FIG. 7 illustrates converting a symbol of a signal in a reception device according to an embodiment of the disclosure.

Referring to FIG. 7, a reception device 120 may perform symbol conversion on vectors of a specific symbol among aligned symbol vectors r.

A decomposition unit 440 of the reception device 120 may convert (711) QPSK or QAM symbols into BPSK or PAM symbol. The component conversion of symbols may be performed through π/2-PAM decomposition, and according to one embodiment, the symbol conversion performed on the i-th QPSK or QAM symbol may be expressed as in Equation 8.

$$d_i = \frac{1}{\sqrt{2}}\begin{bmatrix} b_{1,1} \\ b_{1,2} \\ \vdots \\ b_{1,M} \end{bmatrix} + \frac{j}{\sqrt{2}}\begin{bmatrix} b_{Q,1} \\ b_{Q,2} \\ \vdots \\ b_{Q,M} \end{bmatrix} =$$

$$\frac{1}{\sqrt{2}}\begin{bmatrix} b_{1,1} \\ jb_{Q,2} \\ -(-b_{1,3}) \\ -j(-b_{Q,4}) \\ \vdots \end{bmatrix} + \frac{j}{\sqrt{2}}\begin{bmatrix} b_{Q,1} \\ j(-b_{1,2}) \\ -(-b_{Q,3}) \\ -j(b_{1,4}) \\ \vdots \end{bmatrix} = \frac{1}{\sqrt{2}}R\bar{b}_{1,i} + \frac{j}{\sqrt{2}}R\bar{b}_{2,i}$$

Equation 8

According to an embodiment, the π/2-PAM decomposition of the decomposition unit 440 performed based on Equation 8 may be decomposed into a real number part and an imaginary number part for the QPSK or QAM symbol vector of the aligned vector r, respectively.

According to an embodiment, the decomposition unit 440 may be aligned to have a specific pattern by combining and/or rearranging at least a part of the real number part and the imaginary number part in the QPSK or QAM symbol vectors among symbol vectors of the signal received through the i-th antenna.

For example, referring to Equation 4 and Equation 8, the decomposition unit 440 processes each of the real number part and the imaginary number part of $d_i$, which are QPSK or QAM symbols among the aligned reception signal symbols, into a state in which a constellation rotation matrix R component may be extracted and substituted, and a symbol including $R\bar{b}_{1,i}$ and $R\bar{b}_{2,i}$ of the real number part and the imaginary number part, respectively, may be processed as a π/2-PAM symbol.

Referring to Equation 8, it may be seen that each of the real number part and the imaginary number part of $d_i$, which are QPSK or QAM symbols, are arranged so that patterns 1, j, −1, −j, 1, . . . of the constellation rotation matrix R are extracted.

In other words, the decomposition unit 440 may decompose one proper symbol into two improper symbols through the π/2-PAM decomposition. The decomposition unit 440 substitutes each of the real number part and the imaginary number part of the aligned QPSK or QAM symbols with the constellation rotation matrix R component, by decomposing the substituted real number part and imaginary number part into two π/2-PAM symbols, the symbol conversion may be performed.

The decomposition unit 440 rearranges the converted π/2-PAM symbol vector to generate a newly aligned vector $\tilde{r}$ configured with only the existing received π/2-PAM, π/2-BPSK, BPSK, PAM, linear phase shifted BPSK, or linear phase shifted PAM symbol, and converted π/2-PAM symbols.

According to the above, it is disclosed to convert QPSK or QAM symbol into π/2-PAM symbol, but it is not limited to this, and may be converted into π/2-BPSK symbol through the same or similar operation as the operation of the decomposition unit 440 described above.

According to a further embodiment, newly aligned vector $\tilde{r}$ after π/2-PAM decomposition may be expressed as Equation 9.

$$\tilde{r} = \tilde{H}P\begin{bmatrix} b_1 \\ \vdots \\ b_k \\ \tilde{b}_{1,K+1} \\ \vdots \\ \tilde{b}_{1,N_t} \\ \tilde{b}_{2,K+1} \\ \vdots \\ \tilde{b}_{2,N_t} \end{bmatrix} + \begin{bmatrix} z_1 \\ z_2 \\ \vdots \\ z_{N_r} \end{bmatrix}$$

Equation 9

At this time, a new channel matrix $\tilde{H}$ for processing the π/2-PAM symbol and a linear phase shifted (i.e., the constellation rotation matrix R of Equation 7 is reflected) matrix P are as shown in Equation 10 and Equation 11, respectively.

$$\tilde{H} \triangleq \begin{bmatrix} H_{i,j} & \frac{1}{\sqrt{2}}H_{i,j} & \frac{j}{\sqrt{2}}H_{i,j} \end{bmatrix}$$

Equation 10

Here, $H_{i,j}$ satisfies $1 \leq i \leq K$ and $1 \leq j \leq N_r$, $$\frac{1}{\sqrt{2}}H_{i,j}$$

satisfies $K+1 \leq i \leq N_t$ and $1 \leq j \leq N_r$, and $$\frac{j}{\sqrt{2}}H_{i,j}$$

satisfies $N_t+1 \leq i \leq 2N_t-K$ and $1 \leq j \leq N_r$.

$$P \triangleq \begin{bmatrix} W_M R & 0_{M-by-M} & \cdots & 0_{M-by-M} \\ 0_{M-by-M} & W_M R & \cdots & 0_{M-by-M} \\ \vdots & \vdots & \ddots & \vdots \\ 0_{M-by-M} & 0_{M-by-M} & \cdots & W_M R \end{bmatrix}$$

Equation 11

Here, $W_M$ is a M×M DFT matrix, R is a constellation rotation matrix, and $0_{M-by-M}$ is an M×M all zero matrix. According to an embodiment, the matrix P may be a substitution matrix for configuring symbols of the newly aligned vector r̃ with components of b̄, b̄₁ and b̄₂. Referring to Equation 11, the matrix P may be configured with the constellation rotation matrix and a block diagonal matrix.

According to an embodiment of the disclosure, the improper symbols of the reception signal and symbols converted into the improper symbols may include the block diagonal matrix in their components. The reception device 120 may estimate the BPSK or PAM symbol based on a feature in which the newly aligned symbol vector r̃ includes the block diagonal matrix.

Figure 8:
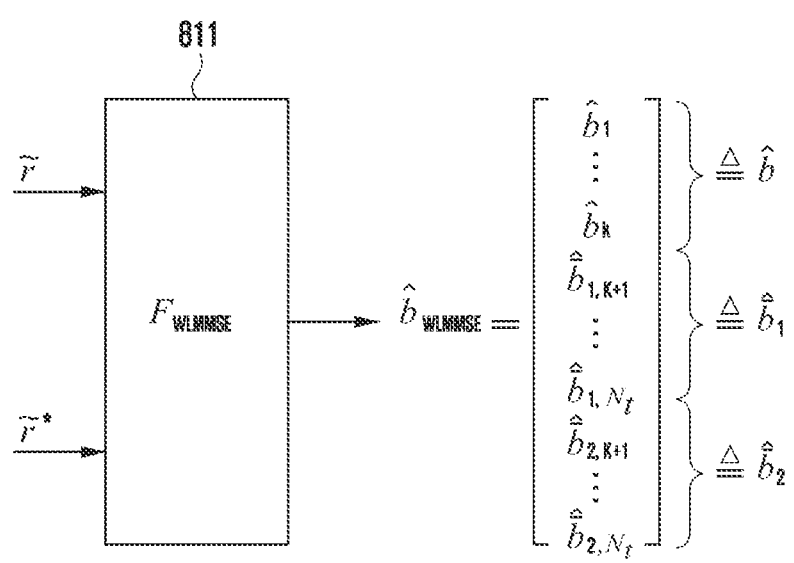
FIG. 8 illustrates estimating a symbol vector in a reception device according to an embodiment of the disclosure.

FIG. 8 illustrates estimating a symbol vector in a reception device according to an embodiment of the disclosure.

Referring to FIG. 8, an estimation unit 450 generates (811) a BPSK or PAM symbol vector $\hat{b}_{WLMMSE}$ estimated by using a low complexity widely linear MMSE estimator $F_{WLMMSE}$ from a newly aligned vector r̃.

At this time, a newly aligned vector r̃ and its conjugate value r̃* may be inputted to the low complexity widely linear MMSE estimator $F_{WLMMSE}$, and the estimated BPSK or PAM symbol vector $\hat{b}_{WLMMSE}$ may be expressed as in Equation 12.

$$\hat{b}_{WLMMSE} = F_{WLMMSE}\begin{bmatrix} \tilde{r} \\ \tilde{r}^* \end{bmatrix} = \begin{bmatrix} \hat{b}_1 \\ \vdots \\ \hat{b}_K \\ \hat{\bar{b}}_{1,K+1} \\ \vdots \\ \hat{\bar{b}}_{1,N_t} \\ \hat{\bar{b}}_{2,K+1} \\ \vdots \\ \hat{\bar{b}}_{2,N_t} \end{bmatrix},$$

Equation 12

$$\begin{bmatrix} \hat{b}_1 \\ \vdots \\ \hat{b}_K \end{bmatrix} \triangleq \hat{b},$$

$$\begin{bmatrix} \hat{\bar{b}}_{1,K+1} \\ \vdots \\ \hat{\bar{b}}_{1,N_t} \end{bmatrix} \triangleq \hat{\bar{b}}_1,$$

$$\begin{bmatrix} \hat{\bar{b}}_{2,K+1} \\ \vdots \\ \hat{\bar{b}}_{2,N_t} \end{bmatrix} \triangleq \hat{\bar{b}}_2$$

In order to determine the low complexity widely linear MMSE estimator $F_{WLMMSE}$, a substitution formula based on Equation 9 is applied, and the substituted matrix Ã may be expressed as Equation 13.

$$\tilde{A} \triangleq \tilde{H}P$$

Equation 13

Therefore, Equation 9 may be expressed as Equation 14 below by substituting the new channel matrix H̃ of Equation 13 and the matrix P in which the linear phase shift is reflected.

$$\tilde{r} = \tilde{A}b + z$$

Equation 14

From Equation 14, the low complexity widely linear MMSE estimator $F_{WLMMSE}$ proposed in the disclosure may be determined to perform the operation of Equation 15.

Equation 15

$$F_{WLMMSE} = E\left\{b\begin{bmatrix} \tilde{r} \\ \tilde{r}^* \end{bmatrix}^M\right\}\left(E\left\{\begin{bmatrix} \tilde{r} \\ \tilde{r}^* \end{bmatrix}\begin{bmatrix} \tilde{r} \\ \tilde{r}^* \end{bmatrix}^M\right\}\right) = \left(\mathrm{Re}\left\{2\tilde{A}^H\tilde{A} + \sigma^2 I_{M(2N_t-K)}\right\}\right)^{-1}[\tilde{A}^H \ \tilde{A}^T] = \left(\tilde{A}^H\tilde{A} + \tilde{A}^T\tilde{A}^* + \sigma^2 I_{M(2N_t-K)}\right)^{-1}[\tilde{A}^H \ \tilde{A}^T] =$$

$$\tilde{W}_M^H \begin{bmatrix} \mathrm{diag}\{\check{h}_{1,1} + \hat{h}_{1,1}\} + \sigma^2 I_M & \mathrm{diag}\{\check{h}_{1,2} + \hat{h}_{1,2}\} & \cdots & \mathrm{diag}\{\check{h}_{1,2N_t-K} + \hat{h}_{1,2N_t-K}\} \\ \mathrm{diag}\{\check{h}_{2,1} + \hat{h}_{2,1}\} & \mathrm{diag}\{\check{h}_{2,2} + \hat{h}_{2,2}\} + \sigma^2 I_M & \cdots & \mathrm{diag}\{\check{h}_{2,2N_t-K} + \hat{h}_{2,2N_t-K}\} \\ \vdots & \vdots & \ddots & \vdots \\ \mathrm{diag}\{\check{h}_{2N_t-K,1} + \hat{h}_{2N_t-K,1}\} & \mathrm{diag}\{\check{h}_{2N_t-K,2} + \hat{h}_{2N_t-K,2}\} & \cdots & \mathrm{diag}\{\check{h}_{2N_t-K,2N_t-K} + \hat{h}_{2N_t-K,2N_t-K}\} + \sigma^2 I_M \end{bmatrix}^{-1} \tilde{W}_M[\tilde{A}^H \ \tilde{A}^T]$$

Here, $W_x^H$ is an M×M IDFT matrix, and $\tilde{W}_x^H$ may be determined through the same or similar method as Equation 6. According to an embodiment of the disclosure, the inverse matrix configuring the low complexity widely linear MMSE estimator $F_{WLMMSE}$ may include a diagonal matrix in at least one block. Referring to Equation 15, it can be seen that each block of inverse matrix configuring the low complexity widely linear MMSE estimator $F_{WLMMSE}$ is configured with a diagonal matrix based on diag{ }. Here, the $\sigma^2 I_M$ component may be determined based on the noise component z in symbols inputted to the low complexity widely.

Here, the $\check{h}_{k1,k2}$ vector and the $\hat{h}_{k1,k2}$ vector included in the inverse matrix of Equation 15 may be expressed as Equation 16 and Equation 17, respectively.

Equation 16

$$\check{h}_{k_1,k_2} \triangleq D_1 \tilde{h}_{k_1,k_2}$$

$$D_1 \triangleq \mathrm{circshift}(I_M, -M/4)$$

$$\tilde{h}_{k_1,k_2} \triangleq \mathrm{diag}\left\{\sum_{k=1}^{N_r} \tilde{H}_{k,k_1}^H \tilde{H}_{k,k_2}\right\}$$

Here, $I_M$ is the M×M unit matrix, and circshift (A,k) performs downshift of rows of the matrix A by k. Here, $D_1$ may be defined as Equation 16 by applying the φ value of case that the number of assigned subcarriers in Equation 2 in $D_1$=circshift($I_M$, −M φ/2π) satisfies a multiple of 4, for example, π/2, the constellation rotation angle of the BPSK symbol, to φ.

Equation 17

$$\hat{h}_{k_1,k_2} \triangleq D_2 \tilde{h}_{k_1,k_2}$$

$$D_2 \triangleq \mathrm{circshift}(\mathit{flipud}(I_M), M/4 + 1)$$

$$\tilde{h}_{k_1,k_2} \triangleq \mathrm{diag}\left\{\sum_{k=1}^{N_r} \tilde{H}_{k,k_1}^H \tilde{H}_{k,k_2}\right\}$$

Here, $I_M$ is the M×M unit matrix, the circshift(A,k) matrix performs downshift of rows of A by k, and flipud($I_M$) may represent a function that inverts $I_M$. Here, $D_2$ may be defined as Equation 17 by applying the φ value of case that the number of assigned subcarriers in Equation 2 in $D_2$=circshift $(I_M, -M\varphi/2\pi+1)$ satisfies a multiple of 4, for example, π/2, the constellation rotation angle of the BPSK symbol, to φ.

As mentioned earlier, an existing widely linear MMSE estimator needs to calculate inverse matrix of size $2MN_r \times 2MN_r$. On the other hand, the inverse matrix of the low complexity widely linear MMSE estimator proposed based on Equation 15 may be configured so that each matrix block includes a block matrix with diagonal matrix in case that the number of assigned subcarriers of the received signal satisfies a multiple of 4.

That is, the symbol estimation of the widely linear MMSE estimator requires calculating the inverse matrix M times of the matrix of which size is $(2N_r-K) \times (2N_r-K)$ instead of calculating the inverse matrix of the channel matrix H of the existing $2MN_r \times 2MN_r$ size, so the Inverse matrix calculation complexity may be very low.

The determinant of the low complexity widely linear MMSE estimator may be determined in case that the number of assigned subcarriers of the received signal satisfies a multiple of 4, in other words, according to the channel environment. For example, the block diagonal matrix included in the inverse matrix operation of low complexity widely linear MMSE estimator may be determined by the number of π/2-BPSK, QPSK, and QAM among the signals received through a plurality of antennas of the reception device 120.

In this case, the low complexity widely linear MMSE estimator $F_{WLMMSE}$ may be newly determined whenever the channel environment changes or according to a designated period. Alternatively, the low complexity widely linear MMSE estimator $F_{WLMMSE}$ may be determined according to the selection of a processor 220.

Figure 9:
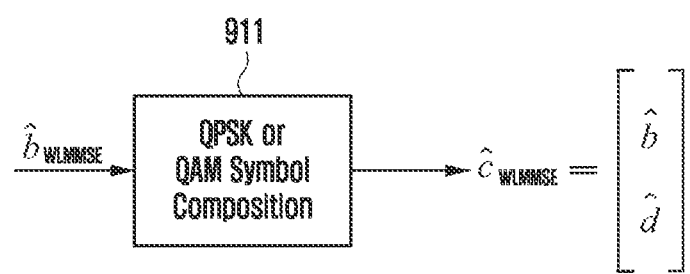
FIG. 9 illustrates converting a symbol of a signal estimated in a reception device according to an embodiment of the disclosure.

FIG. 9 illustrates converting a symbol of a signal estimated in a reception device according to an embodiment of the disclosure.

Referring to FIG. 9, a reception device 120 may perform symbol conversion on vectors of a specific symbol among the estimated BPSK or PAM symbol vector $\hat{b}_{WLMMSE}$. According to an embodiment, a coupling unit 460 as a QPSK or QAM symbol synthesis unit synthesizes (911) π/2-BPSK or π/2-PAM symbols, in other words, $\widehat{\overline{b}}_1$ and $\widehat{\overline{b}}_2$, which are confirmed to be π/2-PAM decomposed in a decomposition unit 440 among the estimated symbols, to QPSK or QAM again.

A vector $\hat{d}$ synthesized from π/2-BPSK or π/2-PAM symbols, in other words, $\widehat{\overline{b}}_1$ and $\widehat{\overline{b}}_2$ to QPSK or QAM symbols, may be expressed as in Equation 18.

$$\hat{d} = \frac{1}{\sqrt{2}}\hat{\overline{b}}_1 \odot \begin{bmatrix} 1 \\ j \\ -1 \\ -j \\ \vdots \end{bmatrix} + \frac{j}{\sqrt{2}}\hat{\overline{b}}_2 \odot \begin{bmatrix} 1 \\ j \\ -1 \\ -j \\ \vdots \end{bmatrix} \quad \text{Equation 18}$$

Referring to Equation 8 and the operation of the decomposition unit 440 together, the coupling unit 460 may determine a real number part and an imaginary number part decomposed into a π/2-PAM symbol vector from the QPSK or QAM symbol vector among the estimated symbols, and may perform an operation of synthesizing the real number part and the imaginary number part and converting them into QPSK or QAM symbol.

According to one embodiment, the coupling unit 460 may identify the decomposed real number part or decomposed imaginary number part for the QPSK symbol or QAM symbol before being converted for the π/2-BPSK or π/2-PAM symbol among the estimated symbol vectors. At this time, the coupling unit 460 may apply the constellation rotation matrix R to the estimated π/2-BPSK or π/2-PAM symbol, and may synthesize corresponding real number part and imaginary number part to convert them into the estimated QPSK symbol or QAM symbol.

In other words, the vector $\hat{d}$ synthesized with QPSK or QAM symbol may be calculated by using π/2-PAM symbol vectors $\widehat{\overline{b}}_1$ and $\widehat{\overline{b}}_2$ estimated through Equation 12, and according to one embodiment, the symbol conversion according to Equation 18 may be obtained by processing the symbol conversion of Equation 8 in reverse order. For example, each of $\hat{d}$, $\widehat{\overline{b}}_1$, and $\widehat{\overline{b}}_2$ of Equation 18 may be substituted at the positions of $d_i$, $\overline{b}_{1,i}$ and $\overline{b}_{2,i}$ of Equation 8. The coupling unit 460 may calculate $\hat{d}$ by processing the substituted Equation 8 in reverse order. The finally estimated symbol vector $\hat{c}_{WLMMSW}$ may be expressed as Equation 19.

$$\hat{c}_{WLMMSE} = \begin{bmatrix} \hat{b} \\ \hat{d} \end{bmatrix} \quad \text{Equation 19}$$

In other words, the estimated symbol vector $\hat{c}_{WLMMSE}$ may be represented as a vector in which the estimated reception signal symbols are aligned.

The reception device 120 significantly improves calculation speed by estimating data symbols as described above, and thus may greatly improve processing performance of a received signal.

Figure 10:
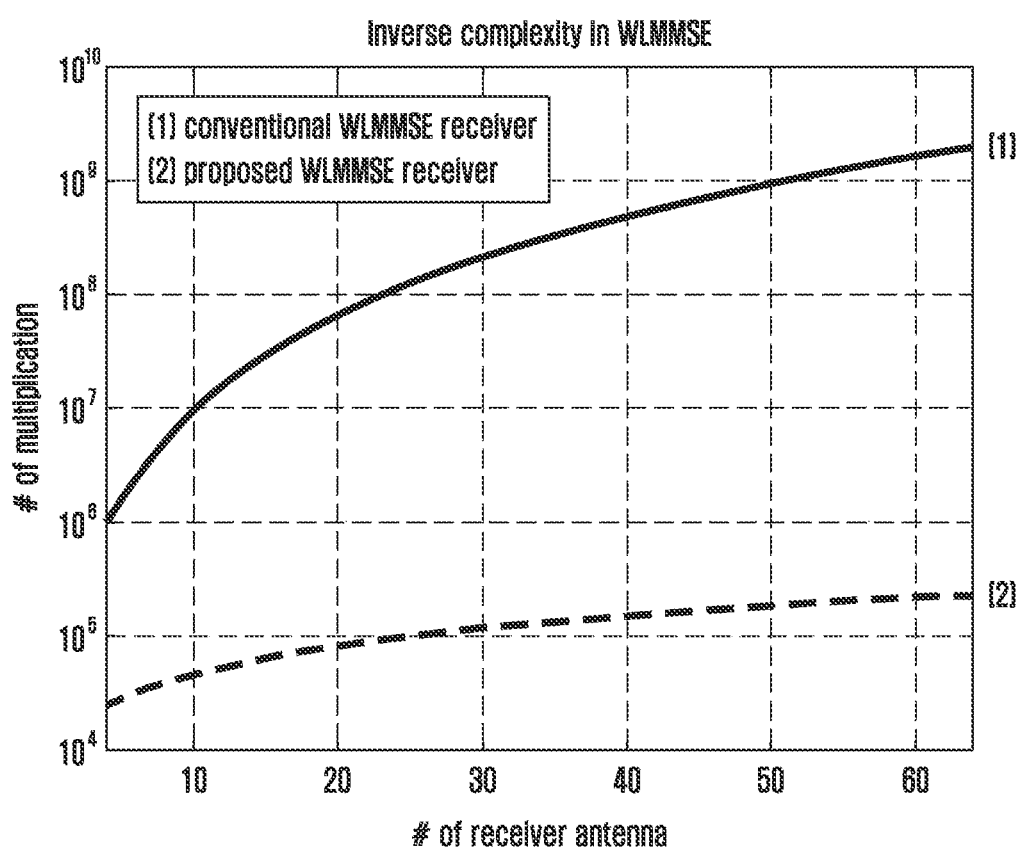
FIG. 10 is a diagram comparing the processing of an existing widely linear receiver and a low complexity widely linear receiver proposed by the disclosure in a reception device according to an embodiment of the disclosure.

FIG. 10 is a diagram comparing the processing of an existing widely linear receiver and a low complexity widely linear receiver proposed by the disclosure in a reception device according to an embodiment of the disclosure.

According to FIG. 10, the graph represents the multiplication complexity (y-axis) for calculating the inverse matrix of the widely linear receiver versus the number of antennas (x-axis) of the reception device 120, and it may be seen that the calculation complexity is significantly reduced when estimating the symbol of the signal through the low complexity widely linear receiver 2 proposed in this disclosure.

FIG. 11 illustrates a main configuration of a receiver of a reception device according to an embodiment of the disclosure.

The receiver of a reception device 120 may be represented by the low complexity widely linear receiver 1101 of including the low complexity widely linear MMSE estimator.

According to an embodiment, the receiver 1101 may include an alignment unit 430 which generates an aligned vector by arranging (or stacking) a signal received through the antenna, a decomposition unit 440 which performs π/2-PAM decomposition on the QPSK or QAM symbol of the vector in which the signal is aligned and converts it into a BPSK or PAM symbol vector, an estimation unit 450 which estimates the symbol of the reception signal by using low complexity widely linear MMSE estimator proposed through the disclosure, and a coupling unit 460 in which the π/2-PAM decomposed reception signal symbol synthesizes the π/2-BPSK or π/2-PAM symbol back into QPSK or QAM, which is the result estimated by the estimation unit 450.

Also, a communication unit 210 may further include a conjugate operation unit 470 for generating a conjugate value of the symbol vector in the input of the estimation unit 450. Also, the communication unit 210 may further include a preprocessing unit 420 including at least one component among a code removal unit 421 that removes the CP of the received signal, a modulation unit 423 that performs IDFT on the CP-removed signal, and a selection unit 425 that determines a resource block (RB).

Figure 12:
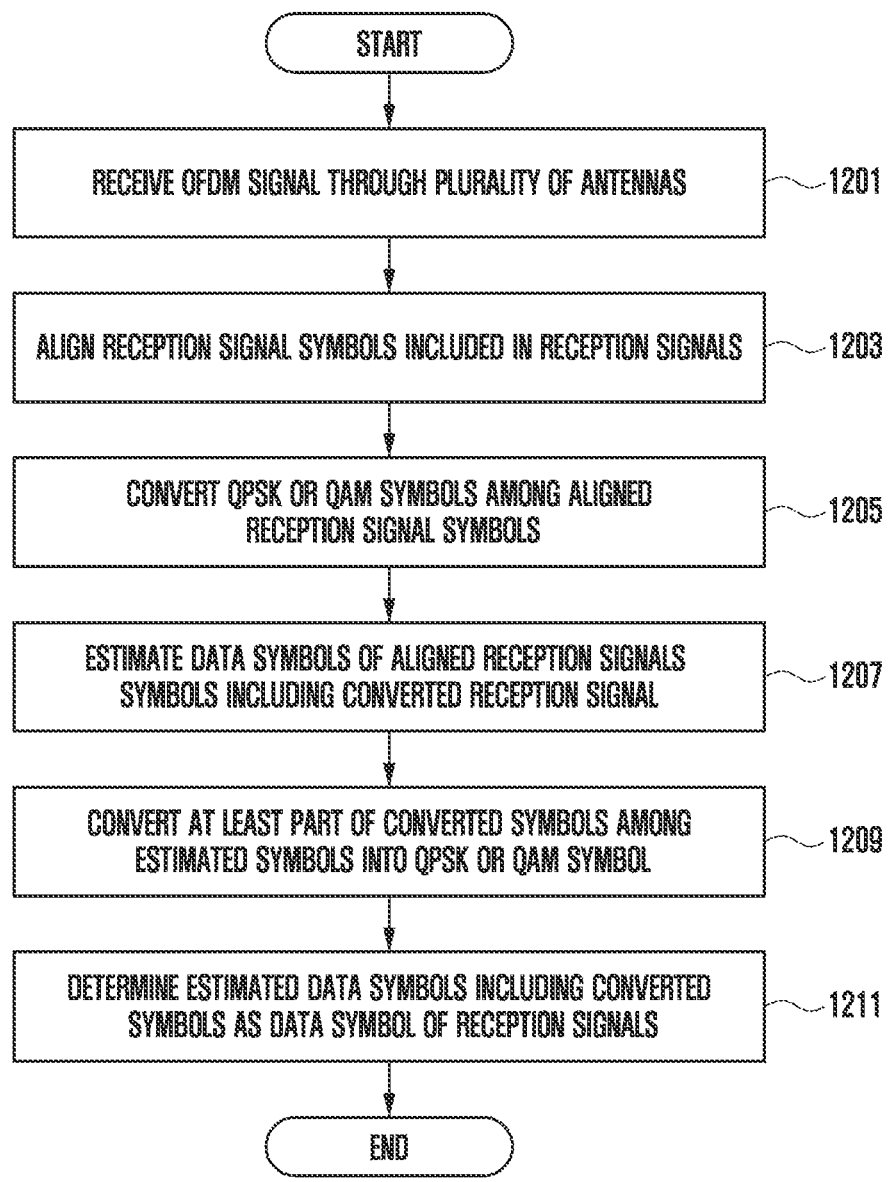
FIG. 12 illustrates a flow of estimating a symbol of a reception signal in a reception device according to an embodiment of the disclosure.

FIG. 12 illustrates a flow of estimating a symbol of a reception signal in a reception device according to an embodiment of the disclosure.

According to operation 1201, a reception device 120 receives an OFDM signal through a plurality of antennas. At this time, the reception device 120 may receive a signal transmitted from a plurality of OFDM transmission device.

According to various embodiments of the disclosure, the signal received by the reception device 120 through a plurality of antennas may include the signal using π/2-BPSK, π/2-PAM, QPSK, or QAM symbol. According to an embodiment, the reception device 120 that receives the signal in a wireless communication environment where at least one symbol of the π/2-BPSK symbol or the π/2-PAM symbol, and at least one of the QPSK symbol or the QAM symbol are mixed and transmitted may be assumed.

Also, the signal received by the reception device 120 may be a signal to which the effect of FDSS is applied from the transmission device 110.

According to operation 1203, the reception device 120 aligns reception signal symbols included in the reception signals. The reception device 120 may stack or arrange the reception signal symbols as a vector. According to an embodiment, the reception device 120 may align the pre-processed symbol vectors $r_i$ as a vector r.

According to operation 1205, the reception device 120 converts the aligned reception signal symbols. According to a further embodiment, the reception device 120 may perform symbol conversion on QPSK or QAM symbols included in the symbol vector r of the aligned reception signal. The reception device 120 may perform π/2-PAM decomposition for converting QPSK or QAM symbols, which are proper symbols, into π/2-PAM or π/2-BPSK symbols, which are improper symbols. For example, the reception device 120 may extract and substitute the constellation rotation matrix R component from each of a real number part and an imaginary number part of the reception signal symbol $d_i$ received from the i-th antenna among the aligned QPSK or QAM symbols. The reception device 120 may output each of the substituted real number part and imaginary number part as two π/2-PAM or π/2-BPSK symbols.

The reception device 120 may generate a symbol vector $\tilde{r}$ of a newly aligned reception signal by using pre-aligned reception signal symbols including symbol-converted vectors.

According to operation 1207, the reception device 120 may estimate data symbols of the aligned reception signal symbols. According to an embodiment, the reception device 120 may estimate $\hat{b}_{WLMMSE}$ as a π/2-PAM or π/2-BPSK symbol vector by applying the newly aligned vector $\tilde{r}$ to the low complexity widely linear MMSE estimator $F_{WLMMSE}$ proposed in the disclosure.

The low complexity widely linear MMSE estimator $F_{WLMMSE}$ may be configured including an inverse matrix in which each matrix block is configured with a block diagonal matrix in case that the reception signal satisfies the designated condition as described above, and may estimate the data symbol by applying the low complexity widely linear MMSE estimator to the π/2-BPSK symbol, the π/2-PAM decomposed QPSK symbol, and the QAM symbol of the reception signal, as described above.

The reception device 120 may estimate data of the symbol vector $\tilde{r}$ of the converted reception signal. At this time, the inverse matrix in which each matrix block of the low complexity widely linear MMSE estimator $F_{WLMMSE}$ is configured with the block diagonal matrix is applied to the channel matrix of $\tilde{r}$ as described above, and more specifically, with reference to Equation 13 and Equation 14, may be applied to a substitution matrix P configured with the block diagonal matrix and a matrix $\tilde{A}$ for a channel matrix $\tilde{H}$.

Here, the designated condition is a φ value of case that the reception signal satisfies a multiple of 4 in the number of assigned subcarriers in Equation 2, and in the case of 5G, when φ=π/2, the number of assignable subcarriers is a multiple of 12, so the condition for applying the low complexity widely linear MMSE estimator $F_{WLMMSE}$ may be satisfied. In other words, in case that a signal including the π/2-BPSK symbol is received, such as in a 5G wireless communication environment, as described above, the low complexity widely linear MMSE estimator $F_{WLMMSE}$ including the inverse matrix in which each matrix block is configured with the block diagonal matrix may be provided.

According to operation 1209, the reception device 120 may convert at least a part of the pre-converted symbols among the estimated symbols into the π/2-PAM symbol or the π/2-BPSK symbol. According to one embodiment, the reception device 120 may determine the estimated vector $\hat{d}$ for the reception signal by synthesizing symbols with a history converted based on π/2-PAM decomposition among the estimated BPSK or PAM symbol vectors $\hat{b}_{WLMMSE}$ into the QPSK symbols or QAM symbol again.

For example, in operation 1205, the reception device 120 may perform an operation of synthesizing the real number part and imaginary number part of the converted symbols again and converting them into QPSK or QAM symbol based on the decomposition of the real number part and the imaginary number part as the π/2-PAM symbol, respectively through π/2-PAM decomposition.

According to operation 1211, the reception device 120 may determine an estimated reception signal symbol vector $\hat{c}_{WLMMSE}$ including symbols in which symbol synthesis has been performed as data symbols of the reception signals as described above.

As described above, various embodiments of the disclosure have been described in detail with reference to the drawings. According to an embodiment of the disclosure, a method for a reception device of a wireless communication system may comprise receiving orthogonal frequency division multiplexing (OFDM) signals through a plurality of antennas, arranging reception signal symbols included in the received reception signals; converting at least one quadrature phase shift keying (QPSK) symbol or quadrature amplitude modulation (QAM) symbol among the arranged reception signal symbols into π/2 phase shifted pulse amplitude modulation (PAM) symbols; estimating data symbols of the arranged reception signal symbols including at least one converted reception signal symbol; converting at least a part of the π/2 phase shifted PAM symbols among the estimated data symbols into the QPSK symbol or the QAM symbol by synthesizing; and determining the estimated data symbols including the converted QPSK symbol or the QAM symbol as a data symbol of the received signals.

Here, the arranging of reception signal symbols included in the received reception signals may arrange the reception signal symbols as a vector.

Here, the converting at least one QPSK symbol or QAM symbol among the arranged reception signal symbols into π/2 phase shifted PAM symbols, may further comprise arranging newly the reception signal symbols based on the converted π/2 phase shifted PAM symbols.

Here, the estimating data symbols of the arranged reception signal symbols including at least one converted reception signal symbol, may estimate the data symbols based on the arranged reception signal symbols and a conjugate value of the arranged reception signal symbols.

Here, the estimating data symbols of the arranged reception signal symbols including the at least one converted reception signal symbol may apply an inverse matrix of a matrix in which at least one matrix block includes a block diagonal matrix to a channel matrix of the reception signal symbols based on a designated condition.

Here, the designated conditions may indicate that in a following equation, $$\frac{M\phi}{2\pi} = k$$

(Herein, φ is a phase shift value that satisfies φ∈[0π], M is a number of assigned subcarriers satisfying M∈N, N is any natural number, and k is an integer) at least one symbol among the reception signals indicates a case where M satisfies a multiple of 4.

Here, the converting at least one QPSK symbol or QAM symbol among the arranged reception signal symbols into π/2 phase shifted PAM symbols may comprise substituting at least one QPSK symbol or QAM symbol among the arranged reception signal symbols so that a constellation rotation matrix is extracted, and determining at least a part of each of a real number part and an imaginary number part of the substituted QPSK symbol or QAM symbol with the π/2 phase shifted PAM symbols.

Here, the converting the π/2 phase shifted PAM symbol among the estimated data symbols into the QPSK symbol or the QAM symbol may comprise determining a real number part and an imaginary number part of the QPSK symbol or the QAM symbol before the conversion among the π/2 phase shifted PAM symbols of the estimated data symbols; and combining the real number part and the imaginary number part of the QPSK symbol or QAM symbol before the conversion.

Here, the determining the real number part and the imaginary number part of the QPSK symbol or the QAM symbol before the conversion among the π/2 phase shifted PAM symbols of the estimated data symbols, may further comprise applying the constellation rotation matrix to each of the real number part and the imaginary number part of the QPSK symbol or the QAM symbol before the conversion.

Here, the designated condition may indicate that the received reception signals include at least one π/2-BPSK symbol.

According to various embodiments of the disclosure, a reception device of a wireless communication system, the reception device may comprise at least one receiver that receives orthogonal frequency division multiplexing (OFDM) signals through a plurality of antennas; at least one processor functionally coupled to the at least one receiver; and a storage unit for storing a processing result of the processor, wherein the at least one processor may be configured to arrange reception signal symbols included in the received reception signals; and convert at least one quadrature phase shift keying (QPSK) symbol or quadrature amplitude modulation (QAM) symbol among the arranged reception signal symbols into π/2 phase shifted pulse amplitude modulation (PAM) symbols, estimate data symbols of the arranged reception signal symbols including the at least one converted reception signal symbol, convert at least a part of the π/2 phase shifted PAM symbols among the estimated data symbols into the QPSK symbol or the QAM symbol by synthesizing, and determine the estimated data symbols including the converted QPSK symbol or the QAM symbol as a data symbol of the received signals.

Here, the at least one processor may be configured to may arrange, the reception signal symbols as a vector.

Here, the at least one processor may be configured to in converting at least one QPSK symbol or QAM symbol among the arranged reception signal symbols into π/2 phase shifted PAM symbols, arrange newly, the reception signal symbols based on the converted π/2 phase shifted PAM symbols.

Here, the at least one processor may be configured to estimate, the data symbols based on the arranged reception signal symbols and a conjugate value of the arranged reception signal symbols.

Here, the at least one processor may be configured to, in estimating data symbols of the arranged reception signal symbols including the at least one converted reception signal symbol, apply, an inverse matrix of a matrix in which at least one matrix block includes a block diagonal matrix to a channel matrix of the reception signal symbols based on a designated condition.

Here, the designated conditions may indicate that in a following equation, $$\frac{M\phi}{2\pi} = k$$

(Herein, φ is a phase shift value that satisfies φ∈[0π], M is a number of assigned subcarriers satisfying M∈N, N is any natural number, and k is an integer) at least one symbol among the reception signals indicates a case where M satisfies a multiple of 4.

Here, the at least one processor may be configured to, in converting at least one QPSK symbol or QAM symbol among the arranged reception signal symbols into π/2 phase shifted PAM symbols, substitute at least one QPSK symbol or QAM symbol among the arranged reception signal symbols so that a constellation rotation matrix is extracted, and determine at least a part of each of a real number part and an imaginary number part of the substituted QPSK symbol or QAM symbol with the π/2 phase shifted PAM symbols.

Here, the at least one processor, in converting the π/2 phase shifted PAM symbol among the estimated data symbols into the QPSK symbol or the QAM symbol, may determine the real number part and the imaginary number part of the QPSK symbol or the QAM symbol before the conversion among the π/2 phase shifted PAM symbols of the estimated data symbols, and may combine the real number part and the imaginary number part of the QPSK symbol or QAM symbol before the conversion.

Here, the at least one processor, in determining a real number part and an imaginary number part of the QPSK symbol or the QAM symbol before the conversion among the π/2 phase shifted PAM symbols of the estimated data symbols, may apply the constellation rotation matrix to each of the real number part and the imaginary number part of the QPSK symbol or the QAM symbol before the conversion.

Here, the designated condition may indicate that the received reception signals include at least one π/2-BPSK symbol.

In describing embodiments of the disclosure in detail, a communication standard set by 3GPP will be a main target, but the main gist of the disclosure may be applied to another communication system having a similar technical background with slight modifications within a range that does not greatly deviate from the scope of the disclosure, and this will be possible with the judgment of a person skilled in the technical field of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

INDUSTRIAL APPLICABILITY

The disclosure may be used in the electronics industry and information communication industry.

What is claimed is:

1. A method performed by a reception device of a wireless communication system, the method comprising:
   receiving orthogonal frequency division multiplexing (OFDM) signals through a plurality of antennas;
   arranging reception signal symbols included in the received OFDM signals;
   converting at least one quadrature phase shift keying (QPSK) symbol or quadrature amplitude modulation (QAM) symbol among the arranged reception signal symbols into π/2 phase shifted pulse amplitude modulation (PAM) symbols;
   estimating data symbols of the arranged reception signal symbols including at least one converted reception signal symbol;
   converting at least a part of the π/2 phase shifted PAM symbols among the estimated data symbols into the QPSK symbol or the QAM symbol by synthesizing; and
   determining the estimated data symbols including the converted QPSK symbol or the converted QAM symbol as a data symbol of the received OFDM signals.

2. The method of claim 1, wherein the arranging of reception signal symbols included in the received OFDM signals comprises arranging the reception signal symbols as a vector.

3. The method of claim 1, wherein the converting of at least one QPSK symbol or QAM symbol among the arranged reception signal symbols into π/2 phase shifted PAM symbols includes arranging newly the reception signal symbols based on the converted at least a part of the π/2 phase shifted PAM symbols.

4. The method of claim 1, wherein the estimating of the data symbols of the arranged reception signal symbols including at least one converted reception signal symbol includes estimating the data symbols based on the arranged reception signal symbols and a conjugate value of the arranged reception signal symbols.

5. The method of claim 1, wherein the estimating of the data symbols of the arranged reception signal symbols including the at least one converted reception signal symbol includes applying an inverse matrix of a matrix in which at least one matrix block includes a block diagonal matrix to a channel matrix of the reception signal symbols based on a designated condition.

6. The method of claim 5,
   wherein the designated condition indicates that:
   in a following equation, $$\frac{M\phi}{2\pi} = k,$$

φ is a phase shift value that satisfies φ∈[0π], M is a number of assigned subcarriers satisfying M∈N, N is any natural number, and k is an integer, and
   wherein at least one symbol among the reception signal symbols indicates a case where M satisfies a multiple of 4.

7. The method of claim 1, wherein the converting of the at least one QPSK symbol or QAM symbol among the arranged reception signal symbols into π/2 phase shifted PAM symbols comprises:
   substituting at least one QPSK symbol or QAM symbol among the arranged reception signal symbols so that a constellation rotation matrix is extracted; and
   determining at least a part of each of a real number part and an imaginary number part of the substituted QPSK symbol or QAM symbol with the π/2 phase shifted PAM symbols.

8. The method of claim 7, wherein the converting of the π/2 phase shifted PAM symbol among the estimated data symbols into the QPSK symbol or the QAM symbol comprises:
   determining a real number part and an imaginary number part of the QPSK symbol or the QAM symbol before the conversion among the π/2 phase shifted PAM symbols of the estimated data symbols; and
   combining the real number part and the imaginary number part of the QPSK symbol or QAM symbol before the conversion.

9. The method of claim 8, wherein the determining of the real number part and the imaginary number part of the QPSK symbol or the QAM symbol before the conversion among the π/2 phase shifted PAM symbols of the estimated data symbols, comprises:
   applying the constellation rotation matrix to each of the real number part and the imaginary number part of the QPSK symbol or the QAM symbol before the conversion.

10. The method of claim 5, wherein the designated condition indicates that the received OFDM signals include at least one π/2-binary phase shift keying (BPSK) symbol.

11. A reception device of a wireless communication system, the reception device comprising:
    at least one receiver that receives orthogonal frequency division multiplexing (OFDM) signals through a plurality of antennas;
    at least one processor functionally coupled to the at least one receiver; and
    a storage unit for storing a processing result of the processor,
    wherein the at least one processor is configured to:
      arrange reception signal symbols included in the received OFDM signals,
      convert at least one quadrature phase shift keying (QPSK) symbol or quadrature amplitude modulation (QAM) symbol among the arranged reception signal symbols into π/2 phase shifted pulse amplitude modulation (PAM) symbols, estimate data symbols of the arranged reception signal symbols including at least one converted reception signal symbol, convert at least a part of the π/2 phase shifted PAM symbols among the estimated data symbols into the QPSK symbol or the QAM symbol by synthesizing, and determine the estimated data symbols including the converted QPSK symbol or the converted QAM symbol as a data symbol of the received OFDM signals.

12. The reception device of claim 11, wherein the at least one processor is further configured to arrange the reception signal symbols as a vector.

13. The reception device of claim 11, wherein the at least one processor is further configured to:

in converting at least one QPSK symbol or QAM symbol among the arranged reception signal symbols into π/2 phase shifted PAM symbols, arrange newly, the reception signal symbols based on the converted at least a part of the π/2 phase shifted PAM symbols.

14. The reception device of claim 11, wherein the at least one processor is further configured to estimate the data symbols based on the arranged reception signal symbols and a conjugate value of the arranged reception signal symbols.

15. The reception device of claim 11, wherein the at least one processor is further configured to:

in estimating data symbols of the arranged reception signal symbols including the at least one converted symbol, apply, an inverse matrix of a matrix in which at least one matrix block includes a block diagonal matrix to a channel matrix of the reception signal symbols based on a designated condition.

* * * * *